(12) United States Patent
Lowe

(10) Patent No.: US 10,183,231 B1
(45) Date of Patent: Jan. 22, 2019

(54) REMOTELY AND SELECTIVELY CONTROLLED TOY OPTICAL VIEWER APPARATUS AND METHOD OF USE

(71) Applicant: Perine Lowe, Inc., Brea, CA (US)

(72) Inventor: Patrice Lowe, Brea, CA (US)

(73) Assignee: Perine Lowe, Inc., Brea, CA (US)

( * ) Notice: Subject to any disclaimer, the term of this patent is extended or adjusted under 35 U.S.C. 154(b) by 0 days.

(21) Appl. No.: 15/446,826

(22) Filed: Mar. 1, 2017

(51) Int. Cl.
| | |
|---|---|
| *G06F 3/01* | (2006.01) |
| *A63H 33/22* | (2006.01) |
| *G09G 5/373* | (2006.01) |
| *G09G 5/377* | (2006.01) |
| *G02B 21/00* | (2006.01) |
| *G02B 21/36* | (2006.01) |
| *G02B 23/12* | (2006.01) |

(52) U.S. Cl.
CPC ......... *A63H 33/22* (2013.01); *G02B 21/0008* (2013.01); *G02B 21/365* (2013.01); *G02B 21/368* (2013.01); *G02B 23/12* (2013.01); *G09G 5/373* (2013.01); *G09G 5/377* (2013.01); *G09G 2340/045* (2013.01); *G09G 2340/12* (2013.01)

(58) Field of Classification Search
CPC ............................................ G06F 3/011–3/013
USPC ......................................................... 345/7–9
See application file for complete search history.

(56) References Cited

U.S. PATENT DOCUMENTS

| | | | | |
|---|---|---|---|---|
| 5,790,013 A | * | 8/1998 | Hauck ..................... | A63J 21/00 340/332 |
| 6,456,262 B1 | * | 9/2002 | Bell ....................... | A61B 3/113 345/472 |
| 9,320,976 B2 | | 4/2016 | Weston | |
| 2005/0096111 A1 | | 5/2005 | Beck | |
| 2007/0040098 A1 | * | 2/2007 | Imazeki ................. | G02B 23/12 250/208.1 |
| 2007/0220108 A1 | * | 9/2007 | Whitaker ................ | G06F 3/017 709/217 |
| 2009/0289956 A1 | * | 11/2009 | Douris ............... | G01C 21/3602 345/633 |
| 2010/0238161 A1 | * | 9/2010 | Varga ...................... | G06T 17/05 345/419 |
| 2011/0084900 A1 | * | 4/2011 | Jacobsen ................. | G06F 1/163 345/156 |
| 2011/0242668 A1 | * | 10/2011 | Potakowskyj ..... | G02B 27/0149 359/630 |
| 2012/0127284 A1 | * | 5/2012 | Bar-Zeev ............. | G02B 27/017 348/53 |
| 2012/0212484 A1 | * | 8/2012 | Haddick ............ | G02B 27/0093 345/419 |

(Continued)

FOREIGN PATENT DOCUMENTS

WO          0169830 A2    9/2001

*Primary Examiner* — Roberto Flores
(74) *Attorney, Agent, or Firm* — Lodestone Legal Group; Jeromye V. Sartain

(57) ABSTRACT

A toy optical viewer apparatus configured for wireless communication with a remote wireless communication device and for selectively displaying an image, the apparatus comprising a body having a first end and an opposite second end and a display system incorporated in the body, the display system comprising a screen in visual communication with the first end and further comprising a microprocessor and an electrically connected RF transceiver configured to receive at least display instructions from the remote wireless communication device for selective display of the image on the screen of the display system.

20 Claims, 11 Drawing Sheets

(56) References Cited

U.S. PATENT DOCUMENTS

| | | | |
|---|---|---|---|
| 2013/0222271 A1* | 8/2013 | Alberth | G06F 1/163 345/173 |
| 2013/0265331 A1* | 10/2013 | Wu | G02B 27/01 345/633 |
| 2015/0253573 A1* | 9/2015 | Sako | G02B 27/0172 345/156 |
| 2015/0378665 A1* | 12/2015 | Han | H04N 21/4126 345/2.2 |
| 2016/0110152 A1* | 4/2016 | Choi | G06F 3/04817 345/2.3 |

* cited by examiner

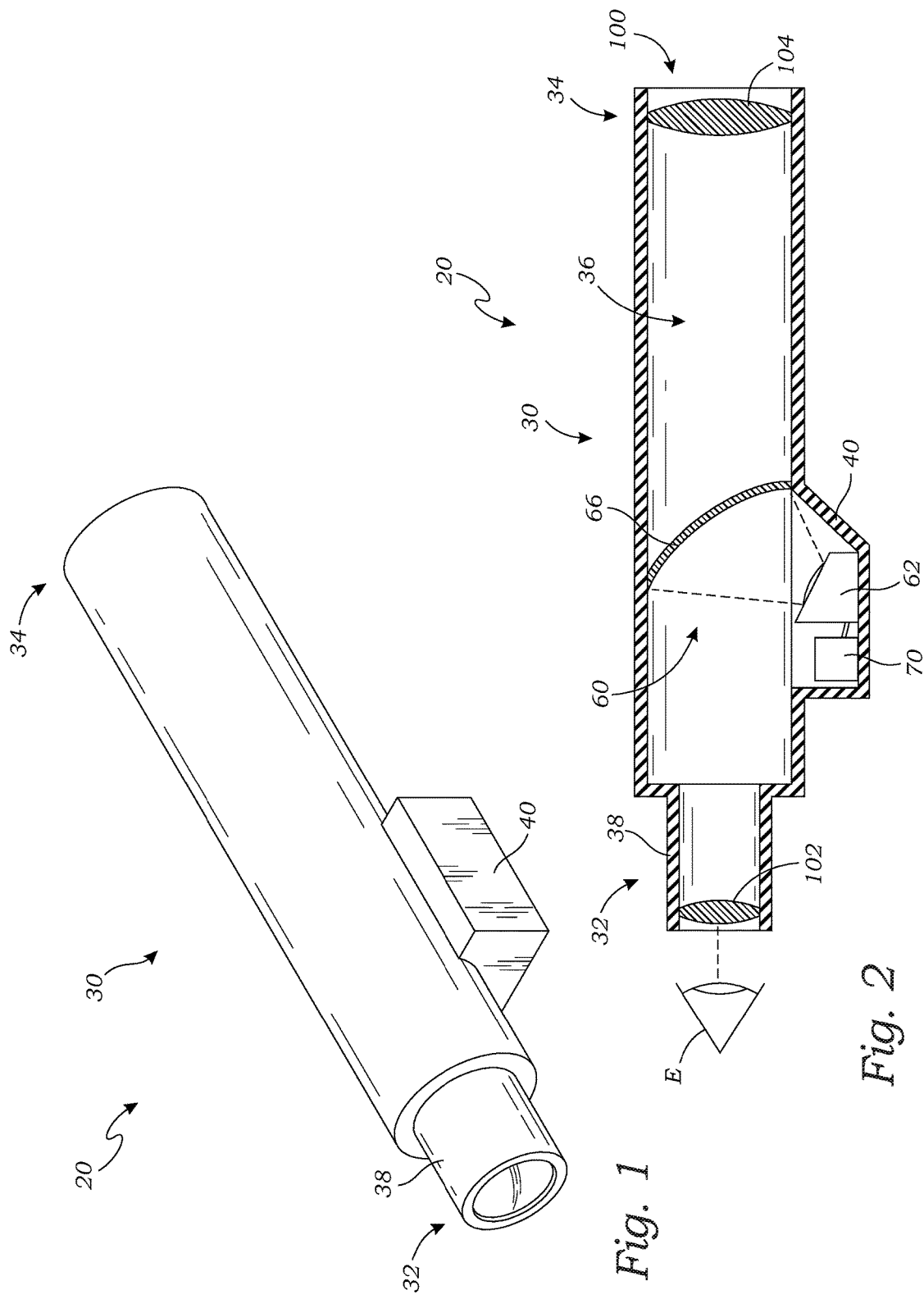

REMOTELY AND SELECTIVELY CONTROLLED TOY OPTICAL VIEWER APPARATUS AND METHOD OF USE

BACKGROUND

The subject of this patent application relates generally to viewing devices, and more particularly to toy viewing devices configured for remote, selective control of images viewable therethrough and related methods of use.

Applicant hereby incorporates herein by reference any and all patents and published patent applications cited or referred to in this application.

By way of background, various toys and viewing devices are known in the art both for pleasure or entertainment and for investigation and surveillance purposes. Such devices include telescopes, binoculars, and microscopes or an assortment of viewers that are either hand-held or in the form of eyewear, masks, headgear, or the like.

Telescopes and other such devices are generally formed with one or more clear lenses through which a user looks with one or both eyes so as to observe something in the environment opposite of and in the direction of the device, or more particularly to observe light reflected from something in front of the device and transmitted through the device, typically in a manner that makes the object seem larger or closer than it really is. This is often achieved through two convex lenses in series that focus the light in a manner so as to optically enlarge the image of the object as it is communicated to the eye first through the main objective lens and then through the smaller eyepiece lens. Binoculars and microscopes work on a similar principle.

By contrast, typical viewers of various kinds enable a user to see objects that are not real or live by displaying such objects or images through the viewer so as to be seen by one or both of the user's eyes. Traditionally, such viewers operate much like photographic slides, involving images on clear substrates or films that are viewable when backlit, as through looking through the viewer and a selected image slide in the direction of a light source or just in the presence of sufficient ambient light so as to then see the image, the viewers most often configured with portals for both eyes in the nature of binoculars. More recently, viewers for both static and dynamic images take the form of masks or headgear that a user wears on or about his or her head and that have a front portion that covers the wearer's eyes and is configured to position a display screen adjacent to and facing the user's eyes, such that content on the display screen would be seen when the viewing device is worn and activated (i.e., turned on) while blocking out the wearer's periphery and ambient light more generally, such viewers commonly now referred to as "virtual reality headsets" due to the kind of dynamic content displayed that can give the impression or illusion of being in an environment other than where the user actually is (i.e., a "virtual" environment). While such a display screen may be incorporated or built directly into the mask or headgear, most commonly such a viewer device is configured to simply removably or temporarily accommodate a smartphone or other computing device having a display screen so as to position the display device as desired adjacent the wearer's eyes and provide the "virtual reality" viewing experience when the display screen device is operated.

Most recently, though related "head-up" technology dates back many years, various viewer or display devices have been proposed that enable content or images to be displayed on a transparent or semi-transparent screen that allows a user to see such "virtual" or projected content and "real" content beyond. Hence, such viewers are described as providing an "augmented reality" rather than a "virtual reality." Conventional head-up or heads-up display ("HUD") technology involves a transparent display that presents data without requiring users to look away from their usual viewpoints, typically comprising a projector unit, a combiner (or screen or other display medium), and a video generation computer of some sort, with the projector/combiner technology generally falling into one of four generational categories for image projection: (1) CRT with phosphor screen; (2) solid state light source such as an LED modulated by an LCD screen; (3) optical waveguides to produce images directly in the combiner, eliminating the need for the projector; and (4) scanning lasers to display content directly on the combiner (clear transparent medium). Related technologies that are worn are known as head-mounted display ("HMD"), which would be analogous to virtual reality headsets and the like that typically display only computer-generated images and content. In the case of an optical HMD ("OHMD"), a wearable display is provided that can reflect projected images while allowing a user to see through the display at the same time, again creating an "augmented reality" rather than a "virtual reality." Another more recent form of somewhat of a hybrid "augmented reality" device is the use of a smartphone as the display, simply held or mounted but otherwise not necessarily incorporated into a mask or the like, with the camera of the smartphone employed in displaying actual surroundings in the direction the camera is pointed but then superimposing CGI images of characters and the like over the camera-fed image, hence "augmenting" reality. In all such cases, while the "real" images of actual surroundings may be seen with the naked eye directly or through a camera feed, the "artificial" images are sourced from computer game software running on the display device or from instrumentation directly connected to the display device (as in the case of aerospace or automotive contexts).

Notably, such prior art devices essentially entail viewing devices through which a user can look to see actual objects, whether or not magnified to any particular extent, virtual reality viewer devices that a user cannot look through to see actual objects or surroundings at all, but instead to see images of objects, whether static or dynamic, or augmented reality viewer devices that overlay actual images with artificial images. What has been needed and heretofore unavailable is a remotely and selectively controlled toy optical viewer apparatus through which a user can see actual objects and surroundings, again whether or not magnified and whether directly or indirectly, and/or superimposed images of objects, whether static or dynamic, such virtual content being selectively controlled from a remote smartphone or other such device paired or wirelessly linked with the viewer apparatus.

Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a toy optical viewer apparatus configured for wireless communication with a remote wireless communication device and for selectively displaying an image. In at least one embodiment, the toy optical viewer apparatus comprises a body having a first end and an opposite second end and a display system incorporated in the body, the display system comprising a screen in visual communication with the first end and further comprising a microprocessor and an electrically connected RF transceiver configured to receive at least display instructions from the remote wireless communication device for selective display of the image on the screen of the display system.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings:

FIG. 1 is a perspective view of an exemplary toy optical viewer apparatus, in accordance with at least one embodiment;

FIG. 2 is a side cross-sectional schematic view thereof, in accordance with at least one embodiment;

Figure 3:
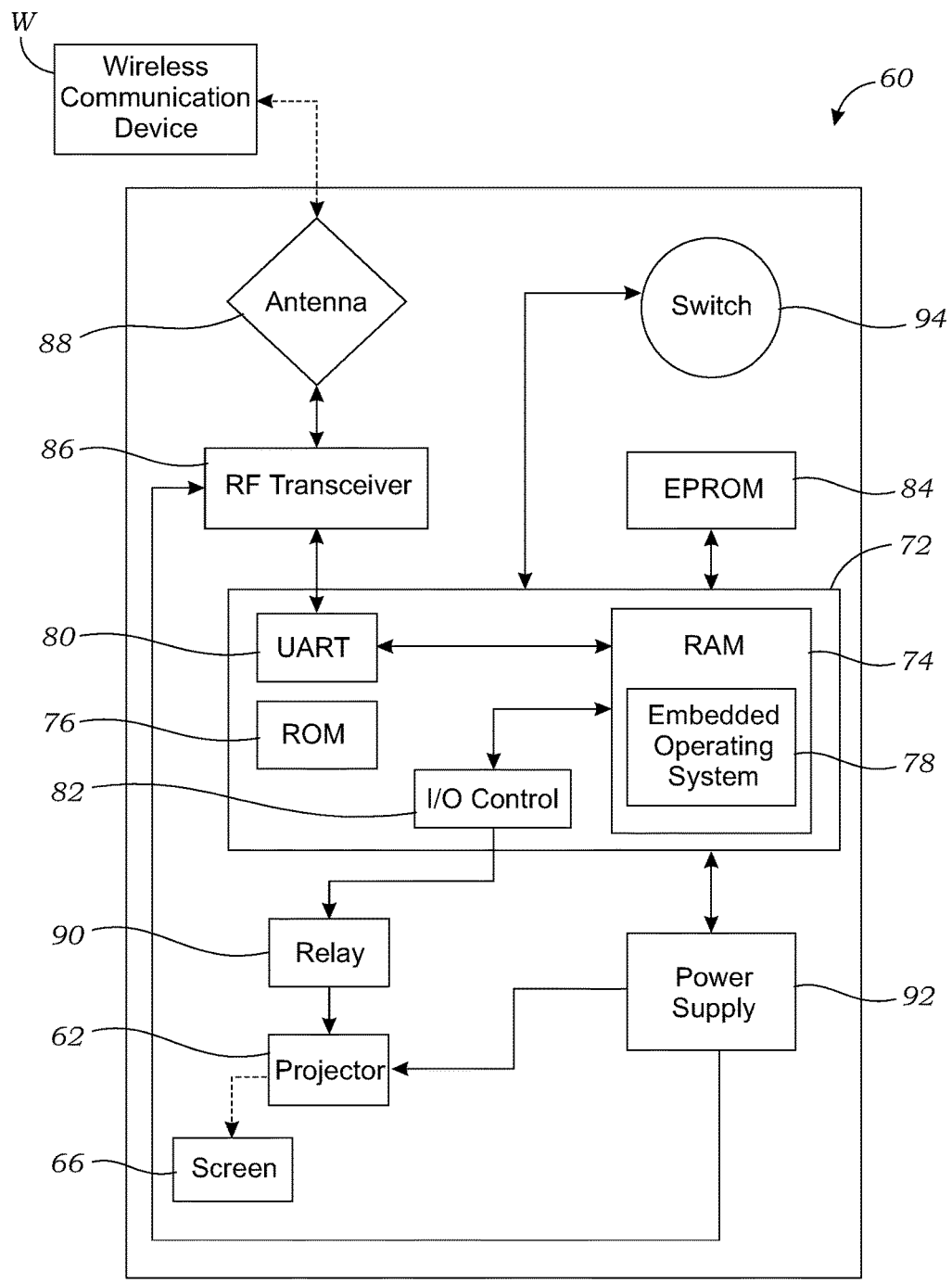
FIG. 3 is an electrical schematic view of a display system thereof, in accordance with at least one embodiment.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments. More generally, those skilled in the art will appreciate that the drawings are schematic in nature and are not to be taken literally or to scale in terms of material configurations, sizes, thicknesses, and other attributes of an apparatus according to aspects of the present invention and its components or features unless specifically set forth herein.

DETAILED DESCRIPTION

Turning now to FIGS. 1 and 2, there are shown perspective and side cross-sectional views of an exemplary embodiment of a toy optical viewer apparatus 20 according to aspects of the present invention. The apparatus 20 comprises, in the exemplary embodiment, a body 30 having opposite first and second ends 32, 34 with a hollow space or cavity 36 therebetween. Generally, such first embodiment of the apparatus 20 is fashioned as a toy telescope that can actually be used as such (i.e., having a clear line of sight through it, so that with the naked eye E objects can be viewed) but that is also equipped with a head-up technology internally (e.g., a clear screen 66 within the body 30 of the telescope-like apparatus 20 on which static or dynamic images can be selectively projected/displayed, more about which is said below). Accordingly, there is at a high level provided according to aspects of the present invention a toy optical viewer apparatus 20 through which both real and/or virtual content may be viewed, with the selection and display of such content being triggered remotely as through a linked smartphone or other such computing device wirelessly communicating with the apparatus 20. As such, it will be appreciated that the apparatus 20 may take a variety of forms beyond those shown and described without departing from the spirit and scope of the invention, as will be further appreciated from the alternative exemplary embodiments disclosed herein. As a further threshold matter, it is noted that the term "screen" as used herein is to be understood broadly as any surface on which content or images are displayed or from which content or images are reflected, whether flat or curved and whether transparent, translucent, or opaque, and incorporating or embodying any appropriate technology now known or later developed. Further, the terms "remote" or "remotely" as used herein are to be understood broadly as describing two objects that, relative to each other, are not physically connected but are instead physically separate, without requiring or suggesting any distance or degree of separation whatsoever. More generally, while the exemplary embodiment of the viewer apparatus 20 is shown and described as a telescope-like device, and alternate embodiments are shown and described herein as a binocular-like device and a microscope-like device, those skilled in the art will appreciate that a variety of other viewer devices now known or later developed may be employed according to aspects of the present invention without departing from its spirit and scope, whether or not fashioned in the appearance of known devices.

With continued reference to FIGS. 1 and 2, such exemplary viewer apparatus 20 being in the nature or form of a telescope, the body 30 is shown as being substantially annular and linear from end to end, again to facilitate straight-line viewing therethrough. At least one eyepiece 38 is configured on the body 30 at the first end 32 into which a user would look. As shown in FIG. 2, within the cavity 36 formed in the body 30 is an optional optical system 100 here comprising opposite lenses—a first lens 102 in the nature of a relatively smaller eyepiece lens positioned within the eyepiece 38 at the first end 32 of the body 30 and a second lens 104 in the nature of a relatively larger main objective lens positioned within the body 30 at the opposite second end 34. Staying with the illustrated telescope-like configuration, here configured as a basic optical telescope, such first and second lenses 102, 104 are substantially parallel and coaxial, meaning that the lens axes all lie along the same line. While both lenses 102, 104 are shown as convex, which is again most typical in a standard optical telescope, it will be appreciated that one or both lenses may be concave, flat, meniscus, plano-concave, plano-convex, or any other such configuration; to be clear, in some embodiments such lens may have no optical properties but only serve as a substantially clear or transparent medium without any magnification effect. The lenses 102, 104 may be glass, plastic or any other appropriate substantially clear or transparent material now known or later developed that allows light to pass through them according to the optical arrangement; any number of lenses may be employed as well, such that the illustrated two convex lenses should be understood as merely exemplary and non-limiting. Those skilled in the art will thus appreciate that the toy optical viewer apparatus 20 of the first exemplary embodiment is capable of functioning as a telescope in terms of collecting electromagnetic radiation such as visible light and focusing such light to aid in the observation of real, remote objects. However, in alternative embodiments, the one or more lenses may be flat or otherwise not focus the light, instead simply allowing the light to pass through, more in the nature of a window, thereby providing no appreciable magnification, or no such lenses or optical system may be employed at all. Fundamentally, there is provided in the first exemplary embodiment an apparatus 20 through which a user may look and see remote, real-world objects, again, whether or not with any degree of magnification; in alternative embodiments what is seen through the viewer apparatus 20 may be entirely virtual, as discussed further below. In forming the body 30, including the eyepiece 38 and any related housing 40 or mount or other feature, it will be appreciated that any appropriate materials and methods of construction now known or later developed may be employed, including but not limited to metals such as steel, aluminum, alloys, and the like and a variety of plastics such as polypropylene, polystyrene, polyvinyl chloride ("PVC"), acrylonitrile butadiene styrene ("ABS"), polyethylenes such as high density polyethylene ("HDPE") and low density polyethylene ("LDPE"), polycarbonate, polyurethane, and other such plastics, thermoplastics, thermosetting polymers, and the like, any such components being fabricated or formed as through injection molding, casting, extrusion, machining, stamping, forming, or any other such technique now known or later developed. Relatedly, such components may be formed integrally or may be formed separately and then assembled in any appropriate secondary operation employing any assembly technique now known or later developed, including but not limited to fastening, bonding, welding, over-molding or coining, press-fitting, snapping, or any other such technique now known or later developed. Those skilled in the art will fundamentally appreciate that any such materials and methods of construction are encompassed within the scope of the invention, any exemplary materials and methods in connection with any and all embodiments thus being illustrative and non-limiting.

Dimensionally, the overall size and scale or proportionality of any such viewer apparatus 20 may vary widely based on a number of factors and contexts—in the present exemplary telescope-style viewer, the overall diameter of the body 30 may range from roughly one to four inches (1-4 in.) and the length may be in the range of six to thirty-six inches (6-36 in.), though again other sizes and shapes or configurations are possible according to aspects of the present invention.

As seen in the cross-sectional view of FIG. 2, the toy optical viewer apparatus 20 according to aspects of the present invention further comprises a display system 60 incorporated therein. More particularly, as noted above, in the exemplary embodiment shown, the display system 60 is in the nature of head-up technology positioned internally, here as a clear screen 66 within the body 30 of the telescope-like apparatus 20 on which images can be selectively projected/displayed, as by the separate projector 62 in conjunction with an electronics module 70 that facilities communication and control, even while real-world images beyond the screen 66 can simply be viewed through it, yielding an "augmented reality" composite view. In the exemplary embodiment, screen 66 is installed within and substantially spanning the cavity 36 within the body 30, though it will be appreciated that such screen 66 may be suspended within or otherwise only span a portion of the cavity 36 at any location or may even be incorporated within the eyepiece 38 of the body 30, particularly as might be enabled by digital micro-mirror and other such miniaturized display technology now known or later developed. Also in the exemplary embodiment, the projector 62 and electronics module 70 are housed within a housing 40 incorporated on or in the body 30 of the viewer apparatus 30 adjacent to the location of the display screen 66. By way of further background, in a typical head-up display ("HUD") there are three primary components: a projector unit, a combiner, and a video generation computer. The projection unit in a typical HUD is an optical collimator setup: a convex lens or concave mirror with a Cathode Ray Tube, light emitting diode, or liquid crystal display at its focus. This setup produces an image where the light is collimated, i.e. the focal point is perceived to be at infinity. The combiner is typically an angled piece of glass (a beam splitter) located in front of the viewer that redirects the projected image from the projector in such a way as to see the field of view and the projected infinity image at the same time. Combiners may have special coatings that reflect the monochromatic light projected onto it from the projector unit while allowing all other wavelengths of light to pass through. In some optical layouts combiners may also have a curved surface to refocus the image from the projector. Finally, the computer provides the interface between the projection unit and the systems/data to be displayed and generates the imagery to be displayed by the projection unit on or via the combiner. Here in the illustrated embodiment, there is thus provided within the display system 60 a projector 62, a combiner in the form of a curved, clear screen 66 on which images are projected by the projector 62, and a video generation computer in the form of an electronics module 70 configured to drive or control the projector 62 so as to selectively project images on the screen 66. In a bit more detail, some HUDs such as that employed in the exemplary embodiment of the present invention allow a computer-generated image ("CGI") to be superimposed on a real-world view, which is again sometimes referred to as augmented reality or mixed reality. Combining real-world view with CGI can be done by projecting the CGI through a partially reflective mirror and viewing the real world directly. Accordingly, this method is often called "optical see-through." Conversely, combining real-world view with CGI can also be done electronically by accepting video from a camera and mixing it electronically with CGI, which is often called "video see-through" and is explained further below in the context of the alternative exemplary embodiment of the apparatus 20 shown in FIGS. 5-7. To achieve such "optical see-through" in the first exemplary embodiment, a "curved mirror" (or curved combiner) approach is shown, again wherein the clear screen 66 is curved or concave relative to the projector 62 and positioned within the body 30 of the apparatus 20 essentially spanning the cavity 36, in whole or in part, between the first and second ends 32, 34 or lenses 102, 104. By way of illustration and not limitation, the screen 66 may be configured as an optical mixer made of partly silvered mirrors, which can reflect artificial images and let real images cross the screen and thus allow a user look through it, such half-silvered or dichroic curved collimating mirror set at an angle performing both tasks of focusing and combining the image. Any other such technologies now known or later developed may be employed instead or in addition, including but not limited to a CRT to generate an image on a phosphor screen, a solid state light source, such as an LED, which is modulated by an LCD screen to display an image, optical waveguides to produce images directly in the combiner rather than using a projection system, or a scanning laser to display images on a clear screen, any such approaches potentially employing one or more of liquid crystal displays (LCDs), liquid crystal on silicon (LCoS), digital micro-mirrors (DMDs), organic light-emitting diodes (OLEDs), diffraction optics/waveguides, holographic optics/waveguides, polarized optics/waveguides, and reflective optics/waveguides. In a bit more detail regarding the curvature of the illustrated mirror or clear screen 66 as it relates to collimation, those skilled in the art will appreciate that the projected image may be collimated, meaning the light rays reflected off the screen are parallel and the lens of the human eye then focuses on infinity to get a clear image, which collimation effect is also referred to as "distant focus." As such, optical methods may be used to present the images at a distant focus, which improves the realism of images that in the real world would be at a distance. Accordingly, collimated images on the screen 66 (or HUD combiner) are again perceived as existing at or near optical infinity. As a result, the user's eye(s) do not need to refocus to view the outside world and the HUD display; rather, the displayed image appears to be "out there," overlaying the outside world. Collimation or distance focusing therefore enables a relatively more realistic augmented reality, though it will be appreciated that simply reflecting uncollimated images on the screen 66 while being able to see through and beyond the screen 66 would still produce the desired "augmented reality" effect. Once more, any such technology or arrangement, now known or later developed, is possible according to aspects of the present invention without departing from its spirit and scope. In terms of field of view ("FOV") considerations, it will be appreciated that a relatively elongated viewer apparatus 20 such as the telescope-like arrangement of the first exemplary embodiment would have a relatively narrow FOV, meaning that the view through screen 66 (i.e., the combiner) and the related lenses 102, 104 might include little additional information beyond the perimeters of the "line of sight" through the body 30; whereas a wide FOV would allow a "broader" view, as will again be appreciated from particularly the alternative exemplary embodiment of FIGS. 5-7 discussed further below. Such head-up displays often also address issues relating to resolution, which is of course tied to field of view and focus distance as discussed herein, such resolution often being indicated as either the total number of pixels or the number of pixels per degree, the former as the total number of pixels (e.g., 1600×1200 pixels per eye) is borrowed from computer monitor or display specifications, while the pixel density, usually specified in pixels per degree or in arcminutes per pixel, is also used to determine visual acuity (e.g., 60 pixels/° (1 arcmin/pixel) is usually referred to as eye limiting resolution, above which increased resolution is not noticed by people with normal vision), with such display systems 60 as employed herein achieving any such resolutions as practical or desired, again incorporating any related technology now known or later developed. Finally, those skilled in the art will appreciate that such display systems 60 may be configured having adjustments in luminance and contrast, whether automated or manual, to account for ambient lighting, which can vary widely (e.g., from the glare of daylight and bright clouds to moonless nights to minimally lit fields).

Turning next to FIG. 3, there is shown an electrical schematic of an exemplary display system 60 according to aspects of the present invention. As a threshold matter, it is to be understood that such schematic is general in nature to convey the various components of the system and their interconnectivity, but is not to be taken literally or strictly as a wiring or circuit diagram or otherwise and is thus illustrative and non-limiting; indeed, some components may be removed and other electronic and related components may be added or substituted without departing from the spirit and scope of the invention. As illustrated, the display system 60 generally comprises a microprocessor 72 having a temporary random access memory ("RAM") device 74 and a permanent "read only memory" ("ROM") device 76, though it is possible that these memory devices 74, 76 could be separate devices from the microprocessor 72 within the display system 60's circuitry or be any other kind of memory or data storage device now known or later developed. The permanent memory device 76 generally stores all of the internal programming of the microprocessor 72 that govern its operation (i.e., firmware), while the temporary memory 74 stores such data as the operating software/system 78 that ultimately controls the operation of the apparatus 20 and so may be changed or programmed per user selections, particularly remotely as through a smartphone application or the like. Optionally, an external EPROM 84 may be provided for storing device configuration and runtime information, including but not limited to the one or more images to be displayed, in the event of a software update/reprogramming of the apparatus 20, and the display system 60 specifically. By way of further example, an on-board Flash ROM (not shown) incorporating the RAM storage 74 may be provided, onto which the embedded operating system 78 and any other image or other data would be flashed. The microprocessor 72 is shown as further including a UART (Universal Asynchronous Receiver/Transmitter) 80, which is a microchip with programming that controls a computer's interface to its attached serial devices so that it can "talk to" and exchange data with modems and other serial devices; specifically, here, the UART 80 is in series between the RAM memory 74 and the RF transceiver 86, the UART 80 handling the TTL serial protocol in order to communicate with the RF module 86. In series with the RF transceiver 86 is shown an antenna 88, it being appreciated that such antenna 88 may be directly installed within or to the display system 60, such as also being contained within the housing 40 (FIGS. 1 and 2), or the antenna 88 may be separately installed and be connected to the display system 60 through an antenna cable and so positioned where desired. Those skilled in the art will appreciate that any RF transceiver or other transmitter or receiver configured for enabling wireless communication now known or later developed may be employed in an apparatus 20 according to aspects of the present invention without departing from its spirit and scope. Notably, as discussed in more detail below in connection with the viewer apparatus 20 in use, the apparatus 20, and the display system 60 particularly, is configured to communicate with a remote wireless communication device W as indicated by the dashed line to and from the antenna 88, which device W may be a smartphone, tablet, PC, or any other computer or computing device now known or later developed that has a wireless transceiver or other such hardware for remote, wireless communication with other devices and is capable of running software configured for remotely interfacing with, controlling, and/or sending image data to other devices such as the apparatus 20, such wireless communication device W further including but not limited to a radio transmitter, optical transmitter, or any other remote control now known or later developed that selectively transmits radio signals or other electromagnetic waves of various frequencies for remote, wireless control of another device, here the viewer apparatus 20, or display system 60, particularly. Where such wireless communication device W is configured more in the nature of a traditional remote control, those skilled in the art will appreciate that such may be configured with any kind of interface now known or later developed, including but not limited to buttons, soft-keys, toggle switches and sticks, and touch screens. Additionally, the microprocessor 72 is also shown as having an I/O (input/output) control 82 in series between a relay 90 and the RAM 74 for facilitating communication with the projector 62. Ultimately, in the exemplary embodiment of FIG. 3, as well as the alternative embodiments of FIGS. 7 and 11, an NXP 2138 SoC (System on Chip) type microprocessor having 512 Kb of onboard Flash ROM (code space) and 32 Kb of RAM may be employed, though once more those skilled in the art will appreciate that any processor and other electrical components and configurations thereof now known or later developed capable of performing as described herein may be employed without departing from the spirit and scope of the invention. It is further noted that an on-board power supply 92 is provided, which may be a DC source such as one or more replaceable and/or rechargeable battery, an AC source such as a wall outlet or other external plug-in, a solar or other such renewable power source, or any other power source now known or later developed capable of powering the circuitry and related components of the apparatus 20, including the other components within the display system 60. Finally, there is shown as part of the exemplary display system 60 a switch 94 for selectively turning the apparatus 20 "on" and "off" or placing the apparatus 20 in any other such operational mode, such as "sleep" or "stand by." Once more, those skilled in the art will appreciate that any and all such electrical components and related arrangements, now known or later developed, are possible according to aspects of the present invention without departing from its spirit and scope.

Figure 4A:
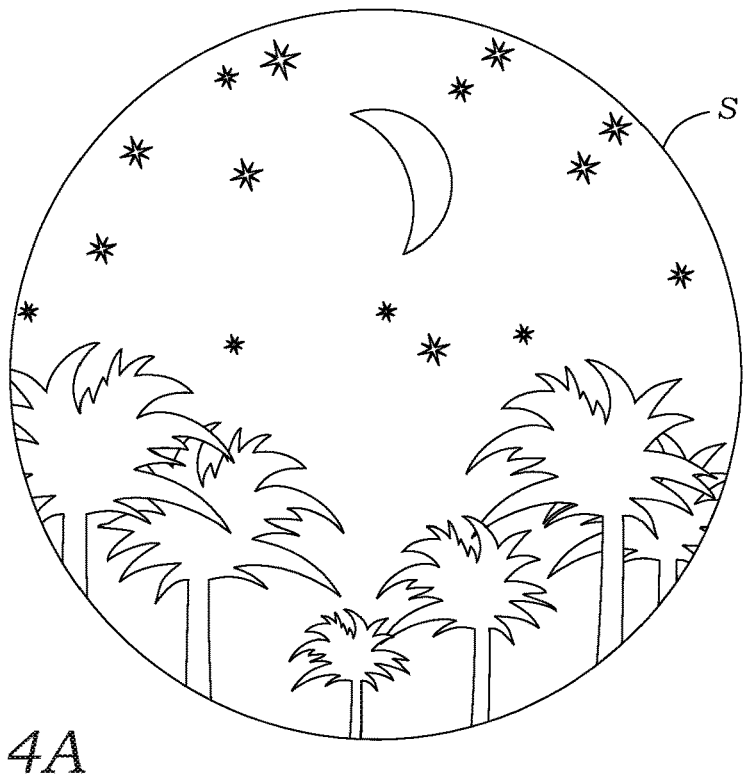
FIG. 4A is an enlarged schematic representation of the view through the apparatus of FIG. 1 displaying a first image.
Figure 4B:
FIG. 4B is an enlarged schematic representation of the view through the apparatus of FIG. 1 displaying a second image.

In connection with use of a toy optical viewer apparatus 20 according to aspects of the present invention as shown and described in connection with FIGS. 1-3, represented schematically in FIGS. 4A and 4B are illustrative views as may be seen through the apparatus 20. First, in FIG. 4A, there is shown a scene S comprising a view of a nighttime sky above treetops with stars and a crescent moon in the sky. This would be representative of a "real world" scene as might be viewed through the apparatus 20. Next, in FIG. 4B, there is shown a computer-generated image I (or CGI) superimposed over the real-world scene S. Here, for example, the image I entails Santa in his sleigh as being pulled by a team of flying reindeer, though of course it will be appreciated that a virtually infinite variety of such images may be employed, whether staying with the Christmas theme, such as a Santa's workshop scene, for example, or any other theme, such as superheroes doing "fly by's", an alien space craft crossing the night sky, etc. Those skilled in the art will appreciate that such image I could be static or fixed or may be dynamic, as by depicting Santa and his sleigh in the exemplary image I passing into the field of view from the left and eventually out of the field of view to the right, at any speed, giving the impression that Santa just "flew by," or the image I could remain within the frame or field of view but still be moving, such as Santa "waving" or the reindeer's legs kicking. In any event, it will be appreciated that the relatively sudden appearance of such a fanciful and exciting image I within an otherwise real-world scene S being viewed would instill awe and wonder in the child looking through the viewer apparatus 20, creating a delightful, fun, and memorable experience for both parent and child. Particularly, it is again noted that in use it is the parent or other person with a smartphone or other such device running the appropriate software and/or other remote control W paired with the display system 60 of the apparatus 20 that is able to then selectively control the content displayed through the viewer apparatus 20. That is, the user would be able to remotely connect to the apparatus 20 and via interactions with the wireless communication device W create and/or select one or more images I to be sent to and/or displayed by the display system 60 of the apparatus 20, whether with the "push of a button" (i.e., through selections made on the device W the image I may be sent and/or the display of such turned "on" or "off") or based on a user-defined schedule (i.e., selections made to "push" or send the selected image content to the apparatus 20 and/or display it at a particular time and for a particular duration, for example). And based on the foregoing discussion in connection with FIGS. 1-3, it will be appreciated that whatever image I is sent to the display system 60 of the apparatus 20 and with whatever instructions, such would then be displayed per the user selections right within the apparatus 20 on the head-up display-type screen 66 so that, once more, the image I "magically" appears to the naked eye to be part of the real-world scene S, since the person looking through the viewer apparatus 20 would see both the actual scene S he or she had been looking at as well as selectively per a user's commands the fanciful virtual image I, thereby providing a composite or "augmented reality" image to spark the child's wonder and amazement. That is, the parent or other user is able to selectively and somewhat secretly cause the virtual image I to be displayed, essentially without the child knowing what the parent has done, due to the remote, wireless communication with the apparatus 20. In the context of the present invention it will again be appreciated that the apparatus 20 and wireless communication device W being "remote" or located "remotely" relative to each other does not signify or require any particular distance or degree of separation, only that the wireless communication device W can selectively control the apparatus 20 without being physically connected to it or necessarily near it, though it will be appreciated that the two may be adjacent or in close proximity within the spirit and scope of the invention, noting again that the wireless communication device W may be any remote control or remote control capable device now known or later developed, and whether operating optically so as to require "line of sight" communication with the apparatus 20 or not. Those skilled in the art will thus appreciate that such a new and novel toy optical viewer apparatus 20 may be implemented in a variety of ways beyond those shown and described in order to selectively and remotely control image content viewed therein, such that the particular illustrated apparatus 20 and use are to be understood as exemplary of aspects of the present invention and non-limiting. More about the use of the viewer apparatus 20 and its pairing and communication with a smartphone or other wireless communication device W is said below in connection with the flow chart of FIG. 13 diagramming illustrative steps in the method of use of the apparatus 20. It will be further appreciated, though, that in other exemplary embodiments the apparatus 20 may be so configured and/or programmed in advance as to selectively display a selected image I without direct, contemporaneous control, as by setting the apparatus 20 to display one or more selected images with a certain time from being turned on or use commencing or in response to certain actions by a person looking through the apparatus 20, such that the display of one or more images I may be delayed from the selection and instruction regarding their display.

Figure 5:
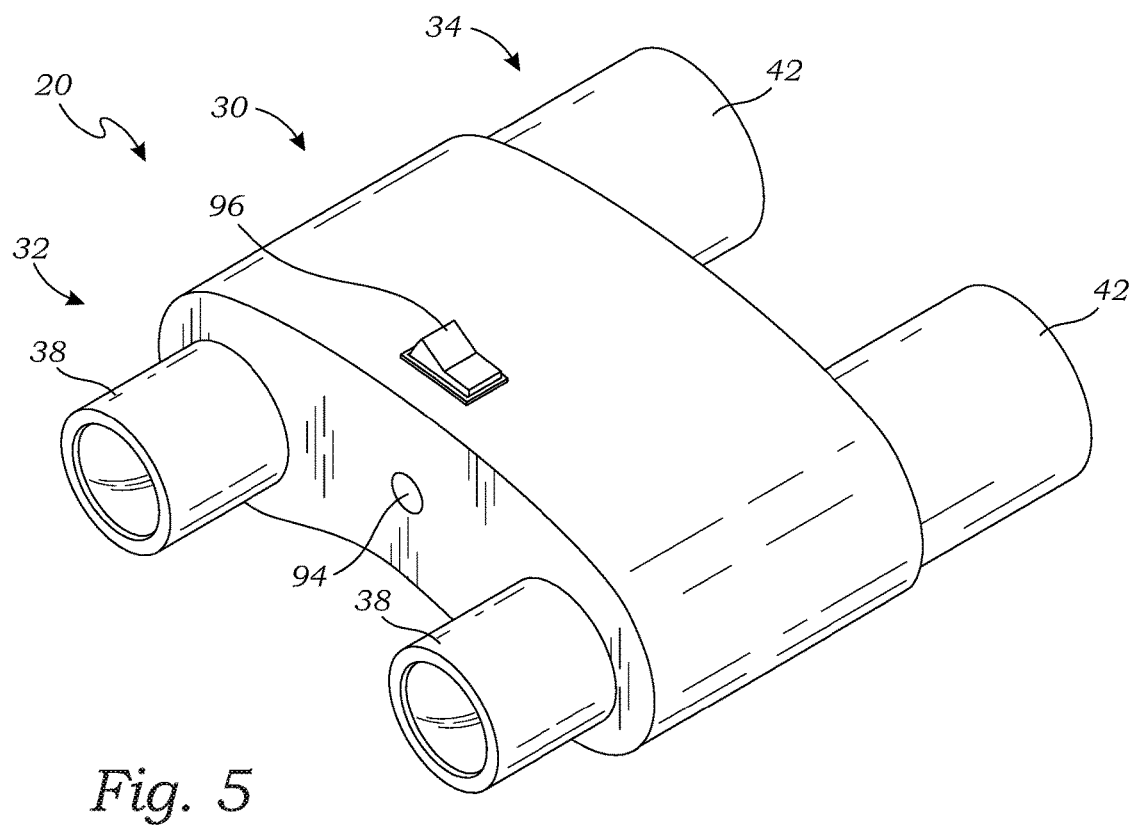
FIG. 5 is a perspective view of an alternative exemplary toy optical viewer apparatus, in accordance with at least one embodiment.
Figure 6:
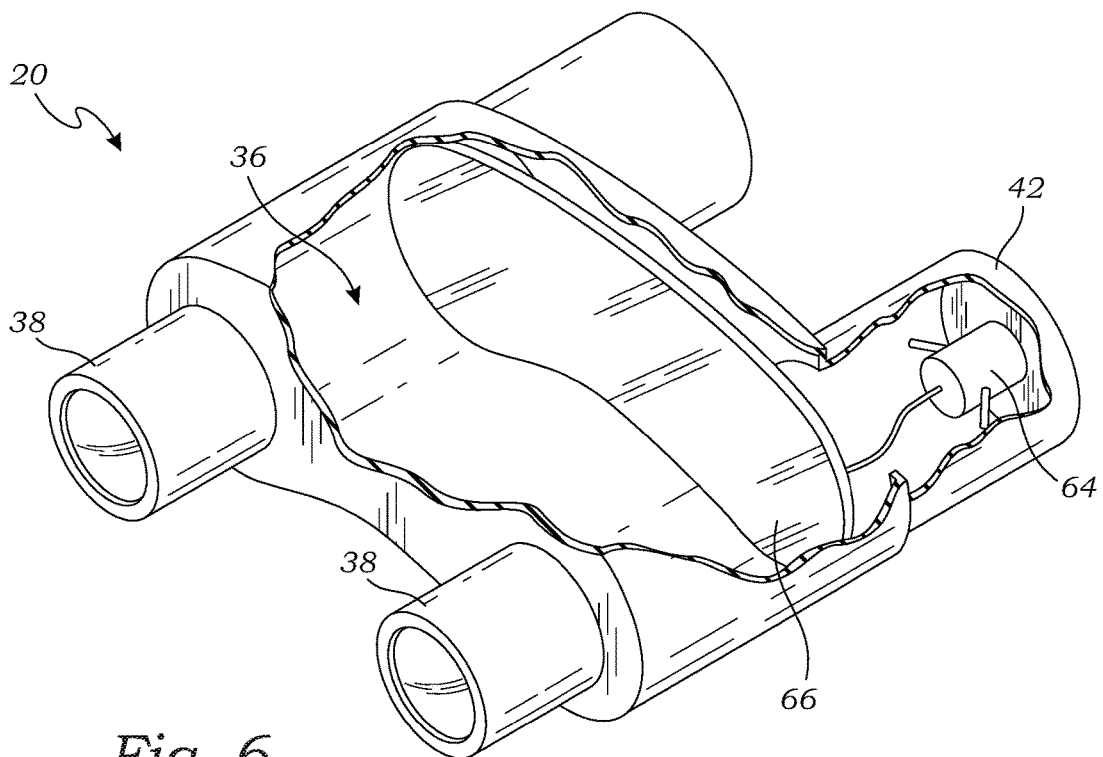
FIG. 6 is a perspective cut-away schematic view thereof, in accordance with at least one embodiment.

Turning to FIGS. 5 and 6, there are shown perspective views, the second partially cut-away, of an alternative exemplary embodiment of a toy optical viewer apparatus 20 according to aspects of the present invention here configured more in the nature of binoculars with two eyepieces 38. The apparatus 20 again comprises a body 30 having opposite first and second ends 32, 34 with a hollow space or cavity 36 therebetween, which space is visible through the eyepieces 38. The eyepieces 38 may include actual or "dummy" lenses or just be hollow, open bores through which one may look. Here, rather than having a direct "line of sight" or other actual view through the apparatus 20 from its first end 32 to its second end 34, there is instead provided a display screen 66 as part of the display system 60 mounted within the cavity 36 opposite the eyepieces 38 such that the screen 66 is viewable therethrough, in whole or in part. In the optical collimator context, the display produces effectively a cylinder of parallel light and so can only be viewed while the user's eyes are somewhere within that cylinder, a three-dimensional area called the head motion box or eyebox; the same principle applies in the present head-up display context even without a reflecting lens or collimator, at least in terms of the dimensional arrangement with both eyes involved in such a binocular-style viewer apparatus 20. Typical HUD eyeboxes are usually about five lateral by three vertical by six longitudinal inches (5×3 x 6 in.), which would be the approximate size of the cavity 36, though perhaps not a full six inches in depth depending on a number of factors; those skilled in the art will appreciate that a range of sizes is possible, such that the indicated dimensions are merely illustrative and non-limiting, though still evidencing the practicality of the size of the toy viewer 20 as a hand-held device. It will also be appreciated that other head-up display technologies, including but not limited to collimating, reflecting, or partially mirrored lenses with related projectors or built-in video image generators may be employed within the display system 60 of the alternative binocular-style viewer apparatus 20. More generally, those skilled in the art will appreciate that such display technologies now known or later developed may be substituted or combined in various toy viewer configurations according to aspects of the present invention without departing from its spirit and scope. Continuing with the present exemplary embodiment, the screen 66, in conjunction with the complete display system 60 including all necessary electronics installed within the body 30 or cavity 36 thereof, selectively displays image content both as sourced from a camera 64, thus representing actual or "real world" objects as in the first exemplary embodiment, only here based on camera or video image data rather than viewing with the naked eye through the apparatus 20, again with or without magnification, and as also supplied as a computer-generated or other such image. Once more, combining real-world view with CGI can thus be done electronically in the alternative embodiment by accepting video from the camera 64 and sending it to the screen 66 and there selectively mixing it or superimposing it electronically with computer-generated images or CGI, which technique is often called "video see-through," versus the "optical see-through" of the first exemplary embodiment, in either case still producing "augmented reality" viewable content containing both real-world and artificial image or viewable content. As shown in FIG. 6, the camera 64 may be positioned in one of the two barrels 42 of the binocular-like body 30 of the apparatus formed at its second end 34, or end opposite the eyepieces 38, which barrels 42, like the eyepieces 38, may have outer lenses or clear covers or may simply be open. It will be appreciated that such camera 64 may be any optical device now known or later developed for capturing and/or processing still or video image data. Relatedly, the lens (not shown) of the camera 64 may be selected or configured as desired to set the "field of view" to be "seen" by the camera 64 and displayed on the screen 66, thereby simulating, for example, the view through standard binoculars, which may be achieved based on the lens configuration notwithstanding that a single camera is inherently "monocular" rather than "binocular," such "fish eye" and other such lenses being known. Whatever the case, the relatively wide angle or wide field of view ("FOV") would allow a "broader" view and thus more of the real-world scene to be viewed at a given time relative to the relatively narrower FOV of a telescope-type viewer or other such "monocular" viewer, as will be further appreciated with reference to the third exemplary embodiment described further below in connection with FIGS. 9-11 wherein the viewer apparatus 20 is in the form of a microscope. Regarding the present binocular-style viewer, it will be appreciated that when both eyes are used as by looking through both eyepieces 38 simultaneously virtually the entire screen 66 would be viewable and thus the complete image that is displayed. Even so, because human eyes are separated, each eye receives a different image; the head-up display image is viewable by one or both eyes even in this binocular context (i.e., one eye could be closed or not looking into an eyepiece), and so the expectation is that either or both eyes view the same image—in other words a "binocular field of view." A further related observation is that such a binocular-style viewer 20 would have the unique ability to show stereoscopic imagery. That is, a binocular HUD has the potential to display a different image to each eye, which can be used to show stereoscopic images. It should be borne in mind that so-called "optical Infinity" is generally taken to be about twenty-five to thirty feet (25-30 ft.). This is the distance at which, given the average human eye rangefinder "baseline" (distance between the eyes or interpupillary distance (IPD)) of between two-and-a-half and three inches (2.5-3 in.), the angle of an object at the "optical infinity" distance becomes essentially the same from each eye, such that any attempted stereoscopic effect would be lost. A related design factor is "binocular overlap," which is a measurement of the area that is common to both eyes.

Binocular overlap is the basis for the sense of depth and stereo, allowing humans to sense which objects are near and which objects are far. Humans have a binocular overlap of about 100° (50° to the left of the nose and 50° to the right). The larger the binocular overlap offered by an HUD, the greater the sense of stereo. Overlap is sometimes specified in degrees (e.g., 74°) or as a percentage indicating how much of the visual field of each eye is common to the other eye. Here, based on the size of the eyebox or cavity 36 and the dimensions of the eyepieces 38, binocular overlap may be in the range of fifty to one hundred degrees (50-100°). Comparatively, humans have an FOV of around 180°, while most HUDs offer far less than this. Typically, a greater field of view results in a greater sense of immersion and better situational awareness, but again this would be more relevant to traditional head-up displays in aviation and automotive contexts or even virtual reality headsets that block peripheral vision by design, whereas the eyebox effect of the binocular-style viewer 20 provides a practical limitation on actual field of view, even if to a lesser extent the perceived field of view, which is tied to "apparent screen size." In practice, the effective FOV of any such viewer apparatus 20 may be in the range of about thirty to one-hundred fifty degrees (30-150°). Further regarding the field of view, it will also be appreciated that by employing a camera 64 rather than the naked eye in terms of image acquisition of the real-world scene, which again also yields a practice limitation on field of view due to the eyebox effect, such camera's lens (not shown) may not only have wide angle lenses or the like but also may have zoom capability as is known, thereby allowing a user to "zoom in" or "zoom out" as with conventional cameras or even with traditional binoculars by adjusting the magnification using the "zoom lever" between the barrels. Here, then, on the body 30 of the apparatus 20 substantially between the eyepieces 38 and barrels 42 there is provided a toggle switch or zoom control 96 for electronically controlling the zoom setting of the camera 64 and thus give the sense that the user is "zooming" in or out by changing the magnification of the "binoculars." Also provided on the body 30 between the eyepieces 38 is an on/off or power switch 94, it being appreciated that the viewer apparatus 20 here being all electronic, it will not work or display any content when looking into the eyepieces 38 unless it is turned "on." In terms of the construction and assembly of the components of the alternative binocular-style viewer apparatus 20, as with the other exemplary embodiments, it will be appreciated that any parts, materials, or methods of fabrication now known or later developed may be employed without departing from the spirit and scope of the present invention.

Figure 7:
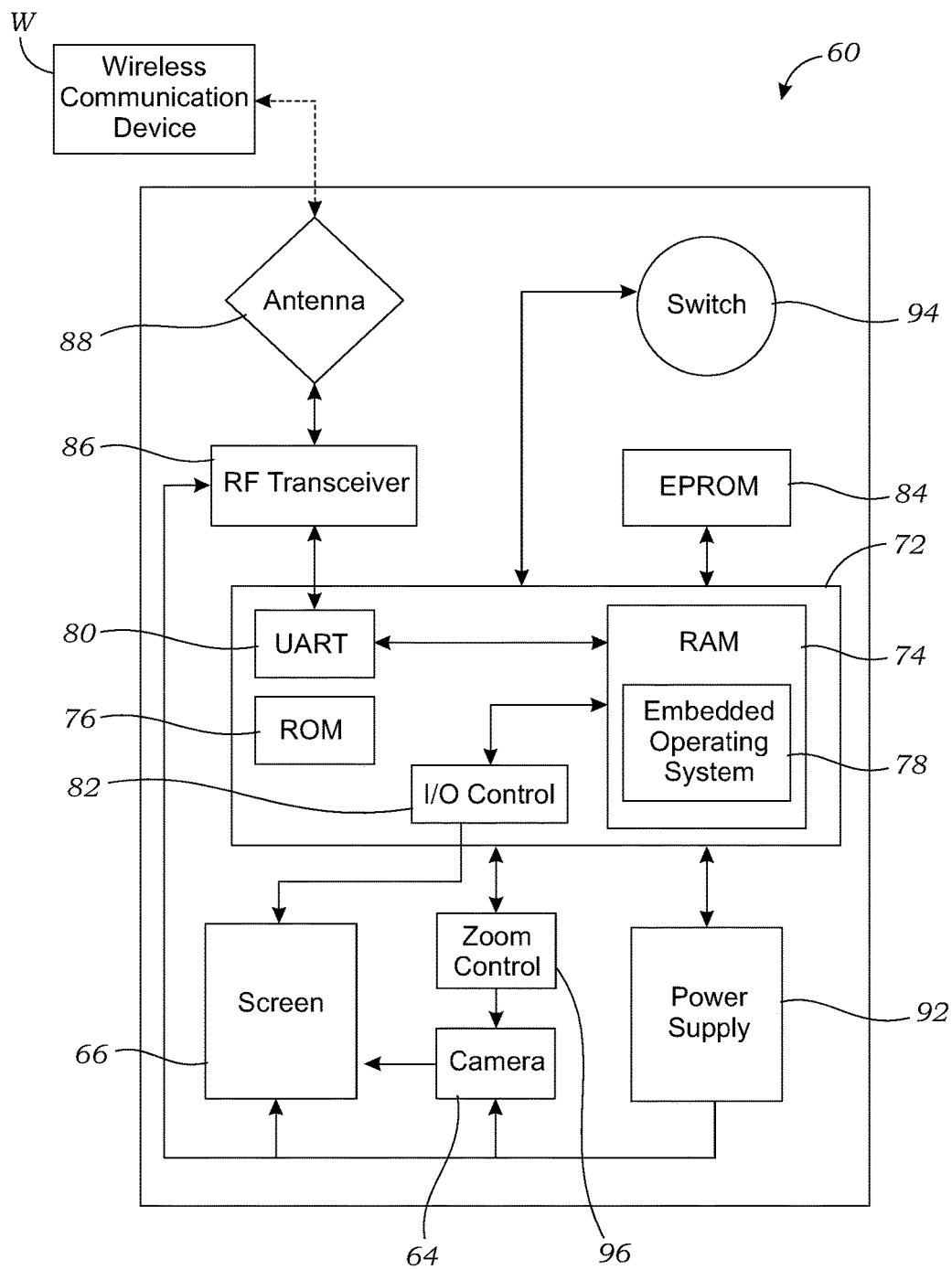
FIG. 7 is an electrical schematic view thereof, in accordance with at least one embodiment.

Referring briefly to the electrical schematic of FIG. 7 associated with the alternative exemplary binocular-style viewer apparatus 20 of FIGS. 5 and 6, it will be appreciated that for ease of illustration the display system 60 is diagrammed in much the same way as it was in FIG. 3 associated with the first exemplary embodiment, including the microprocessor 72 and means such as an RF transceiver 86 for wirelessly communicating with a remote wireless communication device W. Notably, rather than having a projector 62 and related relay 90 as associated with a head-up display as in the first embodiment, here, there is the camera 64 communicating with the display screen 66, with the zoom control 96 connected between the camera 64 and the processor 72.

Figure 8A:
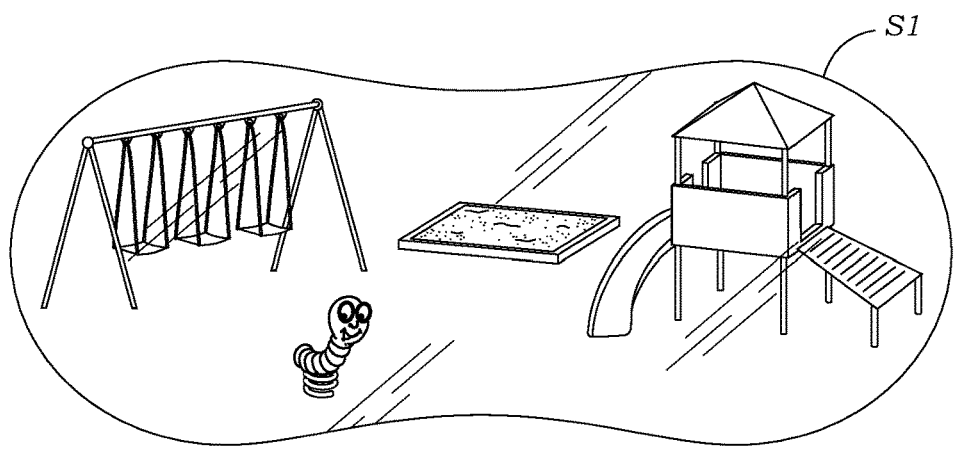
FIG. 8A is an enlarged schematic representation of the view through the apparatus of FIG. 5 displaying a first image.
Figure 8B:
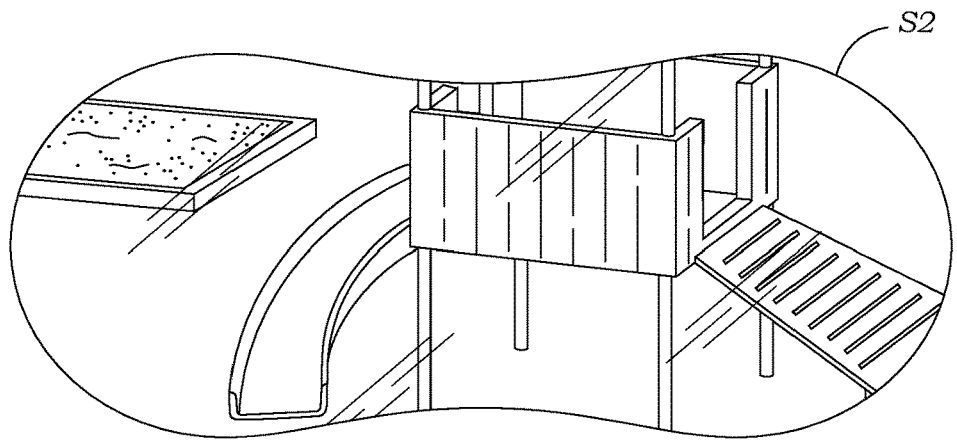
FIG. 8B is an enlarged schematic representation of the view through the apparatus of FIG. 5 displaying a second image.
Figure 8C:
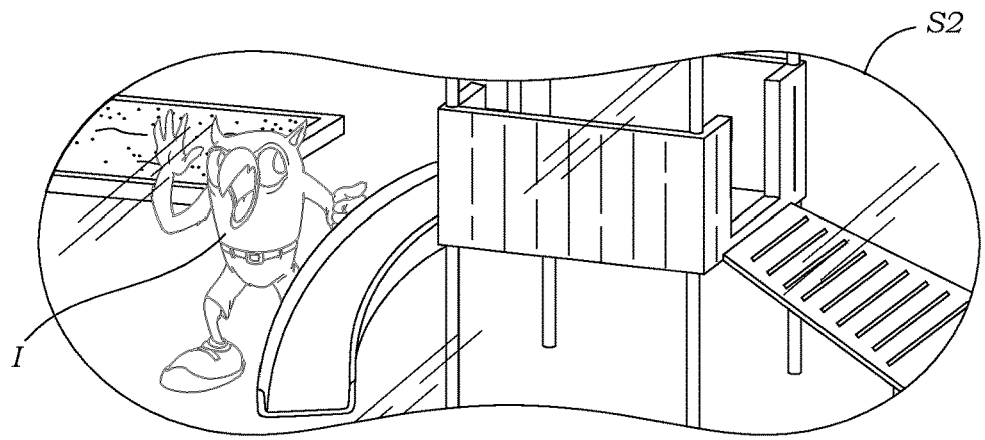
FIG. 8C is an enlarged schematic representation of the view through the apparatus of FIG. 5 displaying a second image.

Turning to FIGS. 8A-8C, there are shown illustrative schematic views as may be seen through the binocular-type apparatus 20 of FIGS. 5-7. Again, in such alternative embodiment fashioned as toy binoculars having two eyepieces 38 and two barrels 42, inside the body 30, rather than having two distinct halves with prisms and lenses as in a conventional pair of binoculars, there is formed a display screen 66 that the user is actually seeing instead, with a camera 64 connected to the display screen 66 and aimed out of one of the two barrels 42 so as to capture real surroundings as the binoculars are aimed in a particular direction and display those real surroundings on the screen 66 within the binocular apparatus 20, further allowing CGI images to be selectively displayed on the screen 66 as superimposed on the real surroundings, the image data being captured by the camera 64 as described above. First, then, in FIG. 8A, there is shown a scene S1 comprising a view of a playground from some distance away. Once more, those skilled in the art will appreciate that the field of view capabilities or characteristics of the camera 64 enable display on the screen 66 of image content representative of the "real world" as viewed through the apparatus 20, including even "shaping" the content or scene S1 to give the visual effect of looking through actual binoculars having "binocular overlap" and again enabling a relatively "wide angle" view. Next, in FIG. 4B, the "zoom" or magnification capabilities of the viewer apparatus 20 are employed as by actuating the zoom control 96 to "zoom in" on a part of the playground, shown as an enlarged slide structure labeled as view or scene S2. Then as shown in FIG. 8C still in connection with the "zoomed in" scene S2 there is shown a computer-generated image I (or CGI) superimposed over the real-world scene S2, here illustrated as a fictional or mythical creature. Once more, such virtual image I superimposed over or mixed or combined with a real-world image results in a composite "augmented reality" view and may be static or dynamic, in the latter case the creature in the image I perhaps moving about or waving. Again, those skilled in the art will appreciate that the sudden and unexpected appearance of a mysterious or other-worldly creature in an otherwise normal scene being viewed would inspire delight and wonder, and perhaps a bit of healthy fear or caution no matter how friendly the imaginary creature in the CGI may seem. A variety of other images and contexts are of course possible according to aspects of the present invention, such that the illustrated augmented reality image display is to be understood as exemplary and non-limiting. Once more, most notably, any such image I may be created and/or selected by a parent or other user remote from the viewer apparatus 20 as by employing a smartphone or other wireless communication device W (FIG. 7) and then sent to and selectively displayed by the viewer apparatus 20 as described herein, all potentially unbeknownst to the child or other person using the binocular-type viewer apparatus 20.

Figure 9:
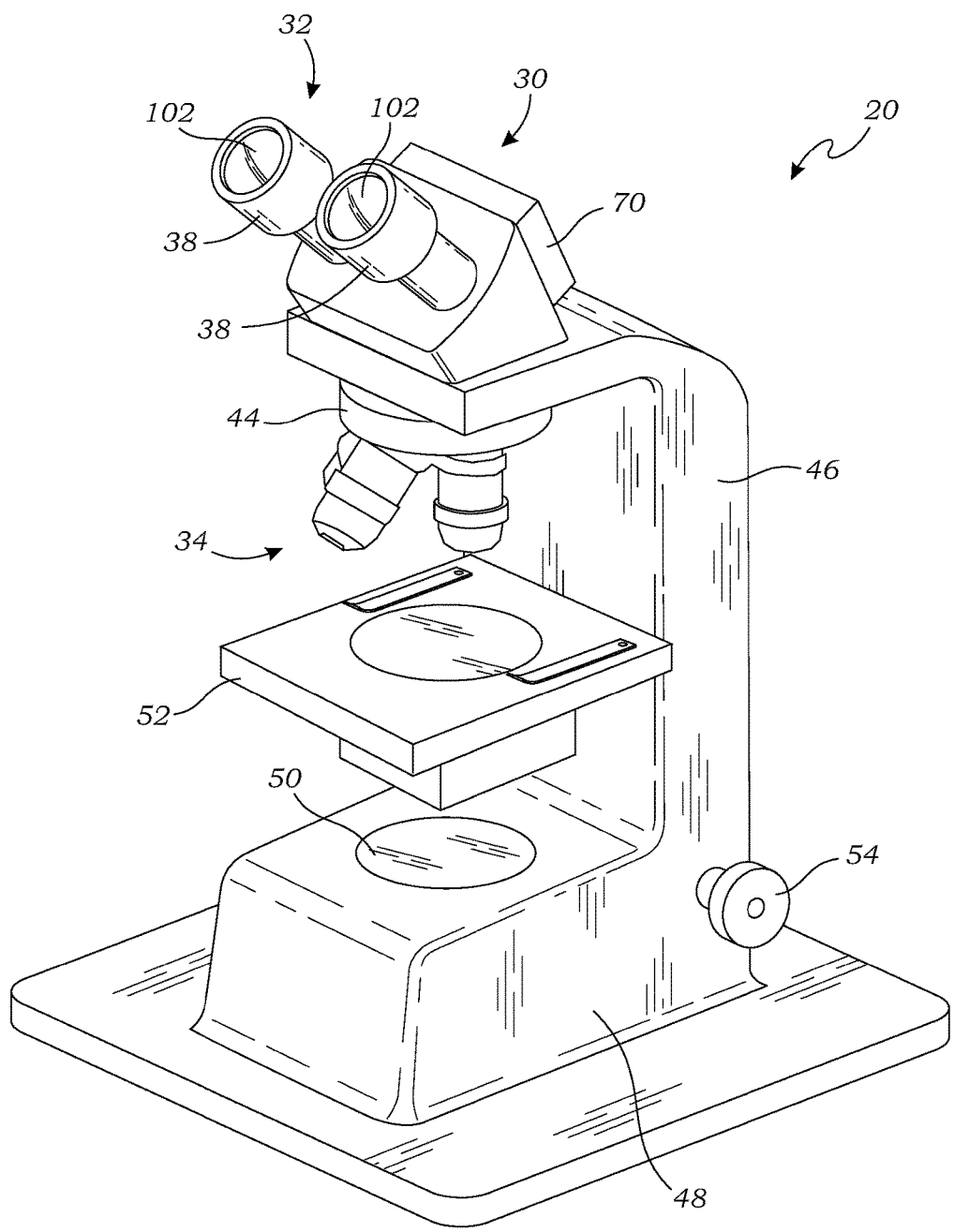
FIG. 9 is a perspective view of an alternative exemplary toy optical viewer apparatus, in accordance with at least one embodiment.
Figure 10:
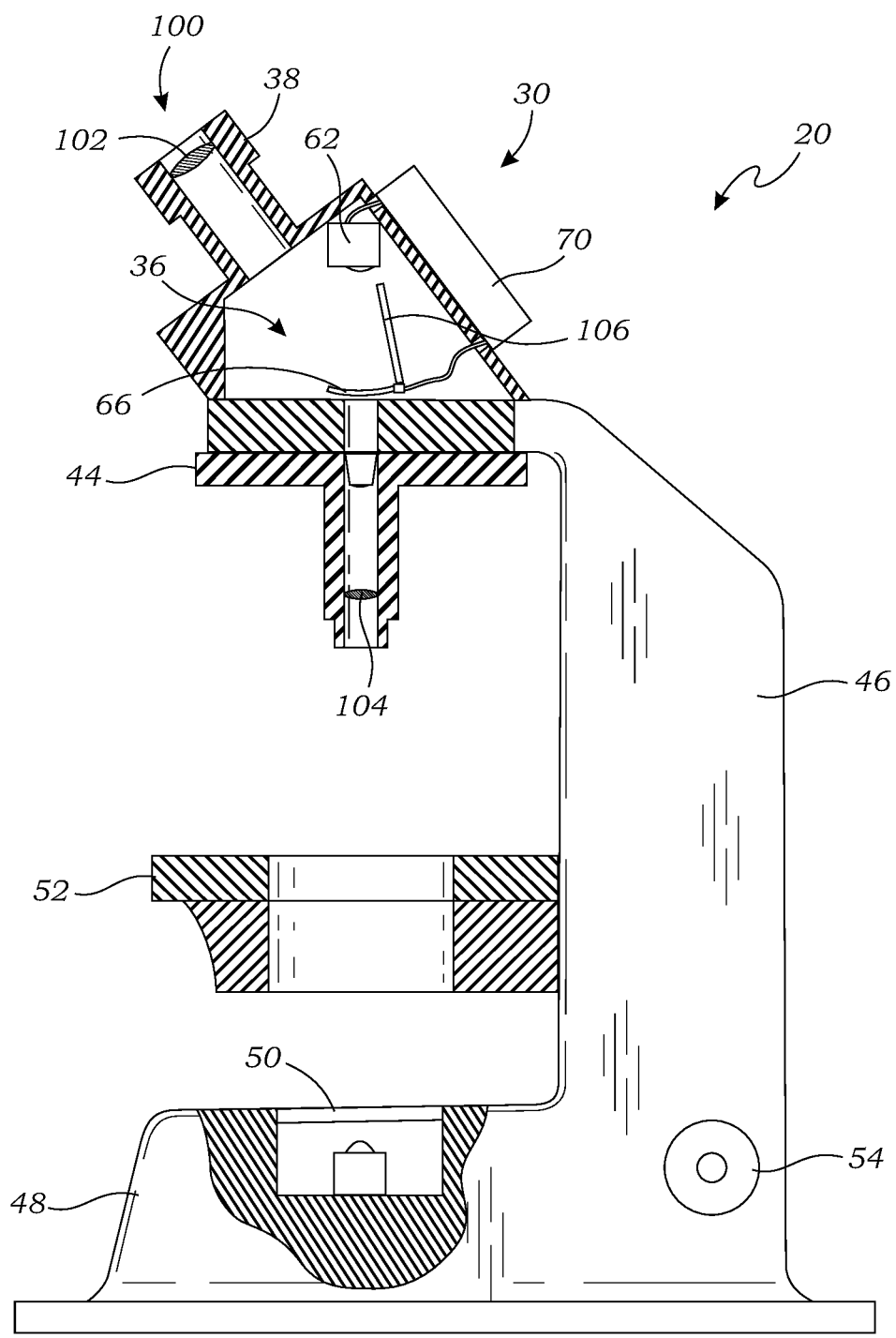
FIG. 10 is a side cross-sectional schematic view thereof, in accordance with at least one embodiment.

Referring next to FIGS. 9 and 10, there are shown perspective and side cross-sectional views of a further alternative exemplary embodiment of a toy optical viewer apparatus 20 according to aspects of the present invention here configured in the nature of a microscope. As with the binocular-type viewer apparatus 20 of FIGS. 5-7, the microscope-style apparatus 10 has two eyepieces 38, yet instead of providing "binocular" vision, just as with standard microscopes, the line of sight "bends" and is collimated into a monocular viewing bore having one or more objective lenses 104 more analogous to the telescope-type viewer apparatus of FIGS. 1-3. In a bit more detail, the viewer apparatus 20 in this third exemplary embodiment again comprises a body 30 generally having opposite first and second ends 32, 34 with a hollow space or cavity 36 therebetween, which body 30 here defines or is configured as the microscope viewing head with the space therein visible through the eyepieces 38. The eyepieces 38 may again include actual or "dummy" lenses or just be hollow, open bores through which one may look, though here there is shown a first eyepiece lens 102 in each eyepiece 38 and again at least one objective lens 104 mounted in the opposite revolving nosepiece 44 affixed on and effectively being part of the body 30. Thus, consistent with typical microscope construction, rather than having a direct "line of sight" or other linear view through the apparatus 20 from its first end 32 to its second end 34 or from the first or eyepiece lens 102 to the second or objective lens 104—though that is certainly possible in alternative constructions, a reflector 106 is positioned within the body or viewing head cavity 36 at an appropriate angle to reflect or "bend" the light focused by the objective lens 104 in the direction of or along the axis of the eyepiece lens 102, it thus being appreciated here that the axes of such lenses 102, 104 are not parallel as they are in the telescope-style viewer 20 of FIGS. 1-3. The reflector 106 also serves to collimate the light rays to and from the objective lens 104, with such double-eyepiece microscopes providing greater viewing comfort but the same image to both eyepieces 38, such image thus being no different from that obtained with a single monocular eyepiece. According to aspects of the present invention, again somewhat analogous to the telescope-style viewer apparatus 20, the microscope-style viewer apparatus 20 is configured with another form of head-up display within the body 30, and the cavity 36 specifically, between the eyepieces 38 and nosepiece 44, or between the eyepiece and objective lenses 102, 104, so that the user again can see what the microscope is actually focusing on but also allow selectively superimposed CGI images. Here, the screen 66 of the display system 60 (FIG. 11) is positioned substantially parallel to or coaxial with the objective lens 104, though it will be appreciated that it can be placed in other locations within the cavity 66 as well, and is configured as an upwardly-facing concave or curved mirror that again allows visibility therethrough while reflecting light or images projected onto it. Opposite the screen 66 and substantially in line therewith, then, is the projector 62, pointing downward from the top of the cavity 36. Both the projector 62 and the screen 66 are operably or electrically connected to the electronics module 70, more about which is said below in connection with FIG. 11, such overall display system 60 being generally configured similarly to that of the other exemplary embodiments, except that in this alternative embodiment the head-up display technology includes shutters (not shown) that can "close" so as to selectively allow only viewing of virtual content projected on the transparent screen 66. In other words, the screen 66 is selectively transparent while still able to reflect an image from the projector 62, as by configuring the lens as a half-silvered or dichroic curved collimating mirror or any other such lens now known or later developed that facilitates head-up "augmented reality" display as by again allowing visualization of both real-world images seen through the lens or screen 66 and virtual or computer-generated images as reflected off of or projected from the same screen 66, and then such lens or screen 66 may be selectively converted to a fully-reflective, non-transparent screen 66 so that only projected or reflected images are viewable through the eyepieces 38 and no longer anything beyond the screen 66. Those skilled in the art will appreciate that such a convertible screen 66 thus enables both augmented reality and complete virtual reality viewing, as will be further appreciated with reference to FIGS. 12A-12C as discussed below; even so, such a screen 66 and related display system 60 is still within the scope of an "optical viewer" as that term is used herein. The actual conversion or shift of the screen 66 may be achieved mechanically, electrically, electro-mechanically, or in any other manner now known or later developed in the art. In one example, physical reflective shutters (not shown) may be selectively closed over the screen 66, while in another example the pixels within the screen 66 may be electrically converted or rotated to produce different effects, as by forming with or embedding in the screen 66 magneto-optical materials to form "optical shutters" on the lens or screen 66. Again, any such technology now known or later developed may be employed. As in other embodiments herein, it will again be appreciated here in the context of the microscope-style toy optical viewer apparatus 20 that any parts, materials, or methods of fabrication now known or later developed may be employed without departing from the spirit and scope of the invention.

Figure 11:
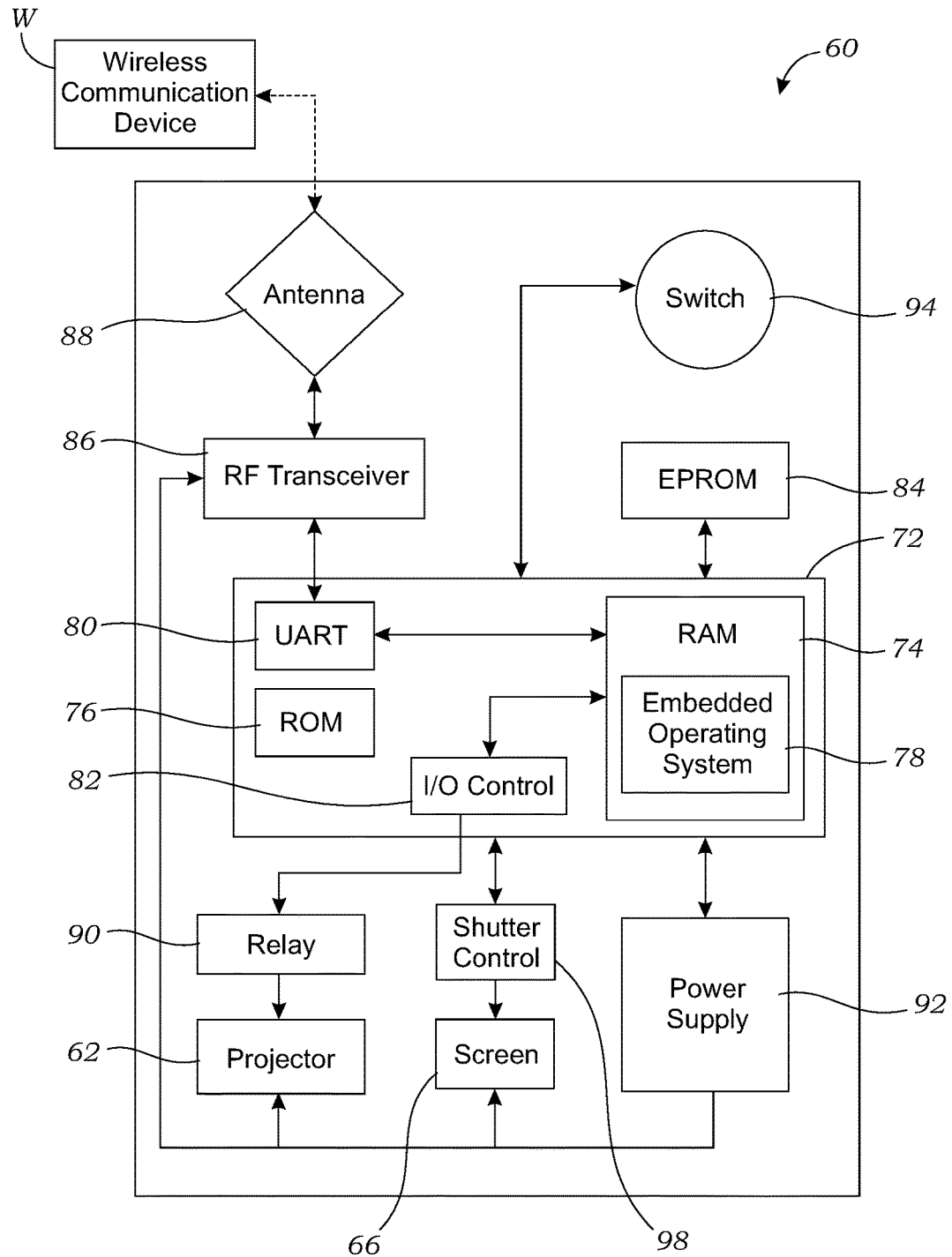
FIG. 11 is an electrical schematic view thereof, in accordance with at least one embodiment.

Referring briefly to the electrical schematic of FIG. 11 associated with the alternative exemplary microscope-style toy viewer apparatus 20 of FIGS. 9 and 10, it will be appreciated that for ease of illustration the display system 60 is again diagrammed in much the same way as it was in FIG. 3 associated with the first exemplary embodiment, including the microprocessor 72 and means such as an RF transceiver 86 for wirelessly communicating with a remote wireless communication device W. Notably, the main difference in terms of the basic electronics components is the inclusion here of a shutter control 98 connected between the display screen 66 and the processor 72. Such shutter control 98 could be activated manually as by a physical toggle switch or other control on the apparatus 20 itself, but is more likely to be a remotely-configurable setting that may be changed through the connected wireless communication device W by the remote user such as a parent, thereby changing the apparatus 20 from "augmented reality" mode to "virtual reality" mode, again as selectively and remotely controlled, in which case the "shutter control" would basically be part of the processor 72 itself, as by being a stored operating command or configuration. Those skilled in the art will again appreciate that any such components and related physical and electrical arrangements now known or later developed are possible according to aspects of the present invention without departing from its spirit and scope.

Figure 12A:
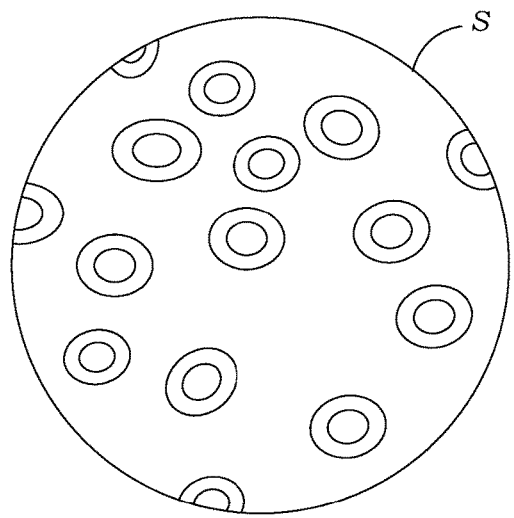
FIG. 12A is an enlarged schematic representation of the view through the apparatus of FIG. 9 displaying a first image.
Figure 12B:
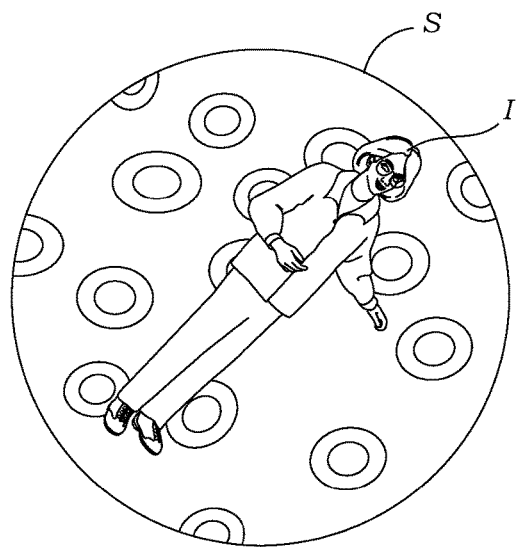
FIG. 12B is an enlarged schematic representation of the view through the apparatus of FIG. 9 displaying a second image.
Figure 12C:
FIG. 12C is an enlarged schematic representation of the view through the apparatus of FIG. 9 displaying a second image.

In use, first with reference to particularly the side cross-sectional view of FIG. 10, it will be appreciated that the microscope-style toy viewer apparatus 20 may be operated in much the same way as a standard microscope, in that a slide (not shown) containing a sample or specimen may be placed on the stage 52 (the stage clips shown in FIG. 9 for retaining a slide being removed in FIG. 10 for simplicity), backlit by the illuminator 50 formed in the base 48, and viewed through the eyepieces 38 as the slide/sample is brought into focus by raising or lowering the stage 52 along the support arm 46 as by adjusting the focus knob 54. Accordingly, as shown in FIG. 12A, there is depicted a "real-world" scene S as might be viewed through the microscope-style apparatus 20 comprising cells or other small matter as might be found on a typical specimen slide and thus viewed by the microscope with some degree of magnification, though again such is not required. It will be appreciated that such cells or the like are schematic and non-specific and that a wide range of matter might be so viewed through the apparatus 20. Next, in FIG. 12B, there is shown a computer-generated image I (or CGI) superimposed over the real-world scene S. Here, for example, the image I entails a human, such as perhaps someone familiar to the child or user of the apparatus 20 like a parent, superimposed over the real-world scene S of the slide view, giving the impression that the parent or other person has been "shrunk" and is now miniature and trapped in the slide with the specimen. Those skilled in the art will again appreciate that such image I could be static or fixed or could be dynamic, as by depicting the person walking or swimming through the cells in the sample or acting as if he or she were trying to get out, or even moving into or out of view, in whole or in part, or again waving or smiling or gesturing toward the viewer. In any case, it will be appreciated that the relatively sudden appearance of such a surprising image I within an otherwise real-world scene S being viewed through the microscope-like toy viewer apparatus 20 would instill awe and wonder in the child looking into it, creating a delightful, fun, and memorable experience for both parent and child. Particularly, it is again noted that in use it is the parent or other person with a smartphone or other such device running the appropriate software and paired with the display system 60 of the apparatus 20 that is able to then selectively control the content displayed through the viewer apparatus 20, remotely connecting to the apparatus 20 and via interactions with the wireless communication device W creating and/or selecting the one or more images I to be sent to and/or displayed by the display system 60 of the apparatus 20, whether through selections made on the device W to turn the image I "on" or "off" or based on a user-defined schedule set to display the image I at a particular time and for a particular duration, for example. And based on the foregoing discussion in connection with FIGS. 9-11, it will be appreciated that whatever image I is sent to the display system 60 of the apparatus 20 and with whatever instructions, such would then be displayed per the user selections right within the apparatus 20 on the head-up display-type screen 66 so that, once more, the image I "magically" appears to the naked eye to be part of the real-world scene S, since the person looking through the viewer apparatus 20 would see both the actual scene S he or she had been looking at as well as selectively per a user's commands the virtual or computer-generated image I, thereby providing a composite or "augmented reality" image to spark the child's wonder and amazement. Thus, the parent or other user is able to selectively and somewhat secretly cause the virtual image I to be displayed, essentially without the child knowing what the parent has done, due to the remote, wireless communication with the apparatus 20. Those skilled in the art will thus appreciate that such a new and novel toy optical viewer apparatus 20 may again be implemented in a variety of ways beyond those shown and described in order to selectively and remotely control image content viewed therein, such that the particular illustrated apparatus 20 and use are to be understood as exemplary of aspects of the present invention and non-limiting. Referring next to FIG. 12C, alternatively, as will be appreciated from the above discussion regarding the selectively operable shutter or other means of shifting or converting the screen 66 within the display system 60 from effectively an "augmented reality" display as above-described with the "miniaturized" person in the slide among the cells or other material in the sample, the same apparatus 20 may be employed even under remote control operation to provide a "virtual reality" display embodying a completely fictional or computer-generated image V, no longer showing or displaying any actual "real-world" content through the optics of the apparatus 20. In this case, then, while looking through the microscope-type toy viewer apparatus 20 the child or other user would suddenly be presented with a fanciful or unexpected virtual scene V, here depicted as fairies and such, and again whether as static or dynamic content, it being appreciated that a practically endless variety of such virtual content or imagery can be embodied in the virtual scene V just as for any of the other CGI content or images I employed in the "augmented reality" contexts shown and described herein by way of example. Those skilled in the art will appreciate that such alternative views—namely, a real-world scene S with computer-generated image I ("augmented reality") as in FIG. 12B and a completely virtual scene S ("virtual reality") as in FIG. 12C—may be toggled or selected between, even in real time as by a parent or other user operating the configured and linked wireless communication device W to "on the fly" or in "real time" control or adjust the operation of the apparatus' display system 60 remotely, or thus shift any such scenes S, V "back and forth" or "on and off," causing further curiosity and amazement for the child or other viewer. More generally, it will be appreciated that all such technologies and uses may be combined or interchanged in a variety of toy optical viewer apparatuses 20 according to aspects of the present invention without departing from its spirit and scope. By way of example and not limitation, a convertible screen 66 or display system 60 as herein described in the context of the microscope-style apparatus 20 may also be employed in a telescope-style apparatus 20 such as shown in FIGS. 1-3 or a binocular-style apparatus 20 such as shown in FIGS. 5-7, and vice versa. Any and all such configurations and related technologies and in any and all combinations, employing components now known or later developed, may be practiced according to aspects of the present invention without departing from its spirit and scope.

Figure 13:
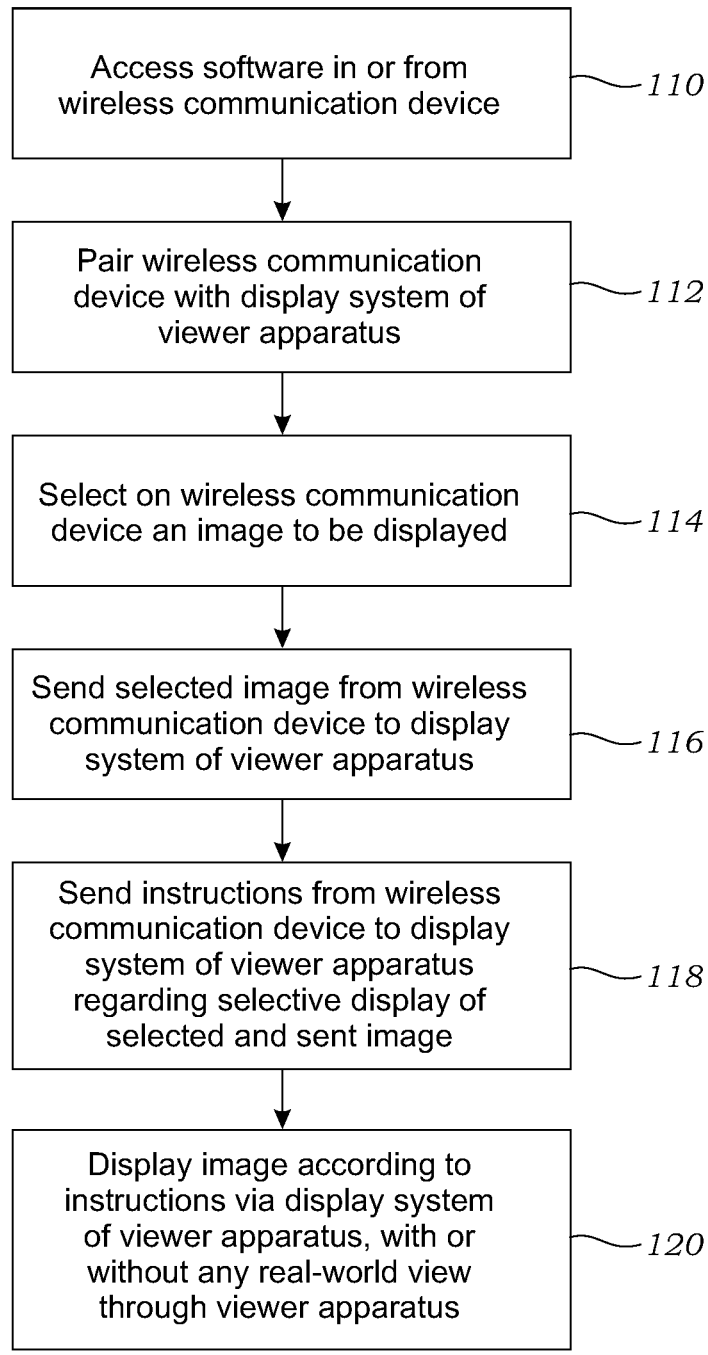
FIG. 13 is a flow chart representing use of an exemplary viewer apparatus, in accordance with at least one embodiment.

More about the use of the exemplary viewer apparatus 20 and its pairing and communication with a smartphone or other wireless communication device W will be appreciated with reference now to the flow chart of FIG. 13 diagramming illustrative steps in the method of use of the apparatus 20. As a threshold matter, it will be appreciated that such steps in employing the apparatus 20 are effectively universal or common to each of the exemplary embodiments herein of FIGS. 1-12 or any other such embodiments according to aspects of the present invention, though it being further appreciated that some steps may not be employed and that numerous additional steps may be implemented unique to a particular arrangement or a particular user's preference, such that the flow chart and the depicted steps are to be understood as illustrative and non-limiting and certainly not exhaustive or all required. First, at step 110, application software either installed or residing on the wireless communication device W or accessed by the wireless communication device W such as a software as a service ("SaaS") portal or the like is accessed or implemented. That is, those skilled in the art will appreciate that such software facilitating remote interaction with and control of the viewer apparatus 20, and the display system 60 thereof particularly, may in one exemplary embodiment be downloaded to and running on a smartphone or other such wireless communication device W in a manner known in the art or may come installed in a dedicated remote control W provided with the apparatus 20. In the case of a "smartphone app," such can then be launched from the device W directly and prompt the user or provide menu or navigation selections regarding configuration settings, pairing or linking with the apparatus 20, and sending image data and/or related display instructions or commands to the apparatus 20. Or, similarly, the user may access a web portal or hosted application over the Internet or the like and from there make similar configuration and operational selections that would be communicated to the remote apparatus 20 as appropriate. Or any other such network or accessible software application now known or later developed may be employed. At step 112, the necessary software having been accessed or operated, the wireless communication device W is then linked or paired with the display apparatus 60 of the remote viewer apparatus 20 so as to enable wireless communication therebetween, again, directly or indirectly. It will be appreciated by those skilled in the art that such pairing and communications may be across any available wireless network now known or later developed, including but not limited to networks or network protocols commonly known as WFi, WMax, Bluetooth, ZigBee, INSTEON, IrDA, wireless USB, Z-Wave, TCP/IP, or any such wireless personal area network ("PAN"), local area network ("LAN"), metropolitan area network ("MAN"), or wide area network ("WAN"), or via radio or other electromagnetic transmissions, alone or in combination, over or through which devices may connect to the Internet and/or with each other, with the hardware, software and firmware of the apparatus 20, including the display system 60, being configured accordingly. It will also be appreciated that a single device W may be paired with and subsequently control multiple viewer apparatuses 20, either independently or simultaneously, as may be the case if a parent has obtained for a child multiple such apparatuses 20, such as both a telescope-style apparatus 20 (FIGS. 1-3) and a microscope-style apparatus 20 (FIGS. 9-11), or where a parent has multiple children each with a respective viewer apparatus 20, again, whether being employed simultaneously or at different times. At step 114, the user may employ the wireless communication device W, directly or indirectly, to create and/or select an image to be displayed via the display system 60 of the linked apparatus 20, whether the image is stored in the device W, is accessed from a remote library by the device W, and/or is already stored in the apparatus 20. Once more, such image may be static (e.g., picture or graphic image) or dynamic (e.g., video or animation) in any format now known or later developed, including but not limited to GIF's, which those skilled in the art will appreciate may be either static images or dynamic (animated). And again, the image(s) may be selected from a library of one or more images residing on the wireless communication device W, residing in the display system 60 of the viewer apparatus 20, or residing in some other remotely accessible database the access to and selection from which being facilitated by the wireless communication device W. At step 116, as appropriate, the selected image(s) is sent from the wireless communication device W to the display system 60 of the apparatus 20, again directly or indirectly as employing any wireless communication network or protocol or other technology now known or later developed, the image being stored, permanently or temporarily, in the memory of the display device 60, typically in the RAM 72, optionally in an EPROM 84, a flash memory device, or any other such memory location now known or later developed and whether on or incorporated in the processor 72 or standing alone (FIGS. 3, 7 and 11). It will be appreciated that such step 116 of sending the selected image(s) would apply in cases where the one or more images are sourced from a location other than the viewer apparatus 20 but would not be necessary where the selected image(s) are already stored in the viewer apparatus 20 as above-described. Relatedly, such one or more images may be pre-stored in the apparatus 20 (i.e., in the memory of the display device 60), whether at the factory or by a user at some point prior to use, such as by connecting to the apparatus 20 as through a wired or wireless connection from a computing device so as to selectively upload image content to the apparatus 20 prior to use. Then, at step 118 instructions are sent from the wireless communication device W to the display system 60 of the apparatus 20, again directly or indirectly as employing any wireless communication network or protocol or other technology now known or later developed. Such instructions may again entail commands regarding displaying the image, either immediately upon receipt of the command or at some later time per an indicated schedule or the like, and in either case potentially an image display duration or stop time (i.e., instructing that the image be displayed for a set number of minutes or seconds before being turned "off," with or without a delayed start time). Alternately, in a more simplified approach, the initially sent command may simply be executed until another command is sent effectively cancelling the first command (e.g., the first command sent is an "on" command and the second at the user's selection from the device W an "off" command, the user thereby remotely turning the image "on" and "off" as the parent or other user observes what the child or other viewer is doing in response to the image appearing or disappearing). Other kinds of user selections and related commands can be sent, including but not limited to instructions relating to whether a dynamic image is to loop or just "play" once. In a more sophisticated exemplary embodiment, the apparatus 20 may even be equipped with sensors (not shown) such that if the user rapidly pans away from the initial field of view or takes his or her eye off of an associated eyepiece, display of the image would automatically stop, for example, to give the appearance that the image (character or the like) is disappearing every time the user looks away, adding further intrigue and suspense. It will also be appreciated that while step 116 of sending the selected image and step 118 of sending related instructions are shown and described as separate steps, should both steps be employed, such steps may also be combined as a single "send" transmission including both the image data and related commands for its display. Finally, at step 120 the selected and/or sent image is displayed at the apparatus 20 employing the associated display device 60. Once more, depending on the embodiment, the image may overlay an otherwise real-world scene or may be a complete virtual scene, or any combination. Those skilled in the art will appreciate that a variety of other steps beyond those shown and described are also possible according to aspects of the present invention. For starters, it will be appreciated that most of the indicated steps may be repeated as desired, such as selecting and/or sending an image and related commands (e.g., multiple images may be selected and then sent in batch, with or without related commands for their respective display, or the sequence of selecting, sending and/or displaying can be performed for one or more images and then repeated as desired for one or more further images). Additionally, for any given image(s) already sent to or stored at the apparatus 20, the display commands can be sent repeatedly and/or serially as needed. Again, those skilled in the art will appreciate that a variety of uses of a viewer apparatus 20 according to aspects of the present invention and related process steps are possible without departing from the spirit and scope of the invention, the indicated process flow chart of FIG. 13 being illustrative and non-limiting.

Aspects of the present specification may also be described as follows:

1. A toy optical viewer apparatus configured for wireless communication with a remote wireless communication device and for selectively displaying an image, the apparatus comprising: a body having a first end and an opposite second end and at least one eyepiece formed at the first end of the body; and a display system incorporated in the body, the display system comprising a screen in visual communication with the at least one eyepiece and further comprising a microprocessor and an electrically connected RF transceiver configured to receive at least display instructions from the remote wireless communication device for selective display of the image on the screen of the display system.

2. The apparatus of embodiment 1 wherein: a cavity is formed within the body between the first and second ends; and the screen of the display system is installed within the cavity.

3. The apparatus of embodiment 1 or embodiment 2 wherein the screen of the display system is installed within the eyepiece.

4. The apparatus of any of embodiments 1-3 wherein the microprocessor and the RF transceiver comprise an electronics module of the display system.

5. The apparatus of embodiment 4 wherein the electronics module is housed within a housing formed on the body.

6. The apparatus of embodiment 4 or embodiment 5 wherein the electronics module further comprises one or more of a RAM, a ROM, a power supply, and a switch.

7. The apparatus of embodiment 6 wherein one of the RAM and the ROM stores an operating system of the display system.

8. The apparatus of embodiment 6 or embodiment 7 wherein one of the RAM and the ROM stores the image and the display instructions.

9. The apparatus of any of embodiments 4-8 wherein the electronics module further comprises a UART electrically connected to the RF transceiver.

10. The apparatus of any of embodiments 4-9 wherein the electronics module further comprises an antenna electrically connected to the RF transceiver.

11. The apparatus of any of embodiments 4-10 wherein the electronics module further comprises an I/O control electrically connected to the screen.

12. The apparatus of embodiment 11 wherein the electronics module further comprises a relay electrically connected between the I/O control and the screen.

13. The apparatus of any of embodiments 4-12 wherein the electronics module further comprises an EPROM electrically connected to the microprocessor.

14. The apparatus of any of embodiments 4-13 wherein the electronics module further comprises a zoom control electrically connected between the microprocessor and a camera.

15. The apparatus of any of embodiments 4-14 wherein the electronics module further comprises a shutter control electrically connected between the microprocessor and the screen.

16. The apparatus of any of embodiments 1-15 wherein the display system further comprises a projector.

17. The apparatus of embodiment 16 wherein the projector is installed within the cavity of the body such that the projector is in optical communication with the screen.

18. The apparatus of embodiment 16 or embodiment 17 wherein the projector is installed within a housing formed on the body such that the projector is in optical communication with the screen.

19. The apparatus of any of embodiments 16-18 wherein the projector is selected from the group consisting of a CRT, a solid state light source, and a scanning laser.

20. The apparatus of any of embodiments 1-19 wherein the screen is selected from the group consisting of a phosphor screen, an LCD display, a liquid crystal on silicon (LCoS) display, a mirror, a digital micro-mirror (DMD), an organic light-emitting diode (OLED) display, and a transparent medium.

21. The apparatus of any of embodiments 1-20 wherein the screen comprises an optical waveguide.

22. The apparatus of embodiment 21 wherein the optical waveguide is selected from the group consisting of a diffraction optics waveguide, a holographic optics waveguide, a polarized optics waveguide, and a reflective optics waveguide.

23. The apparatus of any of embodiments 1-22 wherein the screen comprises a shutter control.

24. The apparatus of any of embodiments 1-23 wherein the display system further comprises a camera.

25. The apparatus of embodiment 24 wherein the camera is installed within the cavity of the body such that the camera points away from the body.

26. The apparatus of embodiment 24 or embodiment 25 wherein the body is configured having at least one barrel and the camera is installed within the barrel.

27. The apparatus of any of embodiments 24-26 wherein the camera is electrically connected to the screen.

28. The apparatus of any of embodiments 24-27 wherein the camera is electrically connected to a zoom control for selectively controlling display size on the screen.

29. The apparatus of any of embodiments 1-28 wherein the apparatus is configured as a telescope.

30. The apparatus of any of embodiments 1-28 wherein the apparatus is configured as binoculars.

31. The apparatus of any of embodiments 1-28 wherein the apparatus is configured as a microscope.

32. The apparatus of embodiment 31 wherein the apparatus further comprises a nosepiece at the second end of the body, the screen being between the nosepiece and the at least one eyepiece.

33. The apparatus of embodiment 31 or embodiment 32 wherein the body is mounted on a support arm and base.

34. The apparatus of embodiment 33 wherein a stage is mounted on the support arm selectively movable through operation of a focus knob installed on the base.

35. The apparatus of embodiment 34 wherein an illuminator is installed in the base and oriented to project through the stage to the nosepiece.

36. The apparatus of any of embodiments 1-35 further comprising an optical system.

37. The apparatus of embodiment 36 wherein the optical system comprises at least one lens.

38. The apparatus of embodiment 36 or embodiment 37 wherein the optical system comprises a first lens installed substantially at the first end of the body within the at least one eyepiece.

39. The apparatus of any of embodiments 36-38 wherein the optical system comprises a second lens installed substantially at the second end of the body.

40. The apparatus of any of embodiments 36-39 wherein the optical system comprises a reflector positioned between the first lens and the second lens.

41. A method of employing a toy optical viewer apparatus as defined in any one of embodiments 1-40, the method comprising the steps of: selecting an image to be displayed by the display system of the apparatus; and sending instructions from the wireless communication device to the display system of the apparatus regarding selective display of the selected and sent image.

42. The method of embodiment 41, wherein the step of selecting an image further comprises creating the image.

43. The method of embodiment 41 or embodiment 42, wherein the image is static or dynamic.

44. The method of any of embodiments 41-43, wherein the image is dynamic and the instructions selectively include a loop command.

45. The method of any of embodiments 41-44, wherein the selected image is stored in the wireless communication device.

46. The method of any of embodiments 41-44, wherein the selected image is stored in the apparatus.

47. The method of any of embodiments 41-46, comprising the further step of sending the selected image from the wireless communication device to the display system of the apparatus.

48. The method of any of embodiments 41-47, wherein the step of sending instructions comprises one or more transmissions of commands selected from the group consisting of an on command, an off command, a delay command, and a schedule command.

49. The method of any of embodiments 41-48, wherein the steps of sending the selected image and sending instructions are performed simultaneously.

50. The method of any of embodiments 41-49, comprising the further step of displaying the selected and sent image according to the instructions via the display system of the apparatus.

51. The method of embodiment 50 wherein the image is selectively displayed superimposed over real-world content as an augmented reality scene.

52. The method of embodiment 50 or embodiment 48 wherein the image is selectively displayed without real-world content as a virtual reality scene.

53. The method of any of embodiments 47-52 wherein the image is selectively displayed for a fixed duration.

54. The method of any of embodiments 47-53 wherein the image is selectively displayed until the apparatus field of view shifts.

55. The method of any of embodiments 41-54, comprising the further step of accessing software in the wireless communication device in conjunction with one or more of the steps of selecting the image, sending the selected image, and sending instructions.

56. The method of any of embodiments 41-55, comprising the further step of remotely accessing software in a portal over a wireless network using the wireless communication device in conjunction with one or more of the steps of selecting the image, sending the selected image, and sending instructions.

57. The method of any of embodiments 41-56, comprising the further step of pairing the wireless communication device with the display system of the apparatus.

58. A kit comprising a toy optical viewer apparatus as defined in any one of embodiments 1-40.

59. The kit of embodiment 58, further comprising a wireless communication device.

60. The kit of embodiment 58 or embodiment 59, further comprising instructional material explaining how to perform the method as defined in any one of embodiments 41-57.

61. Use of a toy optical viewer apparatus as defined in any one of embodiments 1-40 to selectively display an image.

62. The use of embodiment 61, wherein the use comprises a method as defined in any one of embodiments 41-57.

In closing, regarding the exemplary embodiments of the present invention as shown and described herein, it will be appreciated that a toy optical viewer apparatus is disclosed and configured for wireless communication with a remote wireless communication device and for selectively displaying an image. Because the principles of the invention may be practiced in a number of configurations beyond those shown and described, it is to be understood that the invention is not in any way limited by the exemplary embodiments, but is able to take numerous forms without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment.

The methods as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While aspects of the invention have been described with reference to at least one exemplary embodiment, it is to be clearly understood by those skilled in the art that the invention is not limited thereto. Rather, the scope of the invention is to be interpreted only in conjunction with any appended claims here or in any patent application claiming the benefit hereof, and it is made clear that the inventor(s) believe that the claimed subject matter is the invention.

What is claimed is:

1. A toy optical viewer apparatus configured for wireless communication with a remote wireless communication device and for selectively displaying an image, the apparatus comprising:
   a body having a first end and an opposite second end defining a cavity therebetween, the body comprising at least one eyepiece formed at the first end of the body having a first lens installed therein, with a second lens installed at the second end of the body, the body further comprising an integrated offset housing; and
   a display system incorporated entirely internally within the body between the first and second ends, the display system comprising a curved, clear screen installed within and substantially spanning the cavity of the body in visual communication with the at least one eyepiece and in-line between the first and second lenses, the display system further comprising a microprocessor and an electrically connected RF transceiver together comprising an electronics module and a projector in electrical communication with the electronics module, the electronics module and the projector being installed within the housing clear of a line of sight between the first and second lenses through the body, the projector oriented so as to selectively project the selected image onto the screen, the display system configured to receive at least display instructions from the remote wireless communication device for selective display of the image on the screen of the display system; whereby:
   a first user secretly interacting with the remote wireless communication device selectively selects the image to be displayed by the display system of the apparatus and sends the display instructions to the display system through interaction with the remote wireless communication device separately from any action by a second user interacting with the apparatus; and
   the selected image is displayed on the screen of the display system according to the display instructions as by projecting the selected image by the projector onto the screen for viewing by the second user looking through the at least one eyepiece, the second user having no knowledge of the first user selecting the image and sending the display instructions to the display system and having no direct interaction with the display system relating to image selection.

2. The apparatus of claim 1 wherein the screen comprises a shutter control.

3. The apparatus of claim 1 wherein the display system further comprises a camera electrically connected to the screen.

4. The apparatus of claim 3 wherein the camera is electrically connected to a zoom control for selectively controlling display size on the screen.

5. The apparatus of claim 1 wherein:
   the electronics module further comprises one or more of a RAM, a ROM, a power supply, and a switch; and
   one of the RAM and the ROM stores the image and the display instructions.

6. The apparatus of claim 1 wherein the apparatus is configured as one of a telescope, binoculars, and a microscope.

7. The apparatus of claim 1 wherein:
   the remote wireless communication device comprises a smartphone; and
   a software application operable in the smartphone enables the first user to interact with the smartphone in selectively sending the display instructions to the display system.

8. The apparatus of claim 1 wherein the screen is concave relative to the projector.

9. The apparatus of claim 8 wherein the screen is a dichroic curved collimating mirror.

10. The apparatus of claim 1 wherein the remote wireless communication device is a dedicated remote control paired with the apparatus.

11. A method of employing a toy optical viewer apparatus configured for wireless communication with a remote wireless communication device to secretly selectively display an image, the method comprising the steps of:
    secretly selecting an image to be displayed by a display system of the apparatus through interaction by a first user with the remote wireless communication device separately from any action by a second user interacting with the apparatus, the apparatus comprising a body having a first end and an opposite second end defining a cavity therebetween, the body comprising at least one eyepiece formed at the first end of the body having a first lens installed therein, with a second lens installed at the second end of the body, the body further comprising an integrated offset housing, the display system incorporated entirely internally within the body between the first and second ends and comprising a curved, clear screen installed within and substantially spanning the cavity of the body in visual communication with the at least one eyepiece and in-line between the first and second lenses, the display system further comprising a microprocessor and an electrically connected RF transceiver together comprising an electronics module and a projector in electrical communication with the electronics module, the electronics module and the projector being installed within the housing clear of a line of sight between the first and second lenses through the body, the projector oriented so as to selectively project the selected image onto the screen;
    secretly sending display instructions regarding selective display of the selected image to the display system of the apparatus from the remote wireless communication device via the microprocessor and the RF transceiver of the electronics module of the display system based on further interaction of the first user with the remote wireless communication device also separately from any action of the second user; and
    displaying the selected image via the display system according to the display instructions as by projecting the selected image by the projector onto the screen for viewing by the second user interacting with the apparatus as by looking through the at least one eyepiece formed at the first end of the body, the second user having no knowledge of the first user selecting the image and sending display instructions to the display system and having no direct interaction with the display system.

12. The method of claim 11 further comprising the step of sending the selected image from the wireless communication device to the display system of the apparatus via the microprocessor and the RF transceiver of the electronics module of the display system.

13. The method of claim 11 wherein the step of sending instructions comprises one or more transmissions of commands selected from the group consisting of an on command, an off command, a delay command, and a schedule command.

14. The method of claim 11 further comprising the step of accessing software in the remote wireless communication device in conjunction with one or more of the steps of selecting an image and sending instructions.

15. The method of claim 11 further comprising the step of remotely accessing software in a portal over a wireless network using the remote wireless communication device in conjunction with one or more of the steps of selecting an image and sending instructions.

16. The method of claim 11 further comprising the step of pairing the remote wireless communication device with the display system of the apparatus.

17. A method of secretly selectively displaying an image in a toy optical viewer apparatus via remote control, the method comprising the steps of:
  pairing by a first user a remote wireless communication device with a display system of the apparatus incorporated entirely internally within a body of the apparatus substantially between a first end and a second end thereof such that a clear screen of the display system is viewable by a second user only through an at least one eyepiece formed at the first end of the body so as to be in a direct line of sight with both the screen and through the screen to the second end of the body, the body further comprising an integrated offset housing, the display system further comprising a microprocessor and an electrically connected RF transceiver together comprising an electronics module and a projector in electrical communication with the electronics module, the electronics module and the projector being installed within the housing clear of a line of sight through the body from the first end to the second end, the projector oriented so as to selectively project the selected image onto the screen;
  secretly selecting an image to be displayed on the screen of the display system of the apparatus by the first user interacting with the remote wireless communication device unbeknownst to the second user interacting with the apparatus;
  secretly sending display instructions regarding selective display of the selected image to the display system of the apparatus from the remote wireless communication device via the microprocessor and the RF transceiver of the electronics module of the display system based on the first user further interacting with the remote wireless communication device also unbeknownst to the second user; and
  displaying the selected image on the screen of the display system according to the display instructions as by projecting the selected image by the projector onto the screen for viewing by the second user looking through the at least one eyepiece, the second user having no knowledge of the first user selecting the image and sending display instructions to the display system and having no direct interaction with the display system, whereby the second user views both a real-world scene as looking through the eyepiece and the screen and out the second end of the body and further selectively views the selected image on the screen superimposed over the real-world scene based on the secret interaction of the first user with the display system of the apparatus via the wireless communication device for visually surprising the second user.

18. A toy optical viewer apparatus configured for wireless communication with a remote wireless communication device and for selectively displaying an image, the apparatus comprising:
  a body having a first end and an opposite second end defining a cavity therebetween, the body comprising two spaced-apart eyepieces formed at the first end of the body so as to both be in visual communication with the cavity, the body further comprising two spaced-apart barrels formed at the second end thereof substantially opposite of and in-line with the respective spaced-apart eyepieces; and
  a display system incorporated entirely internally within the cavity of the body offset from the two spaced-apart eyepieces, the display system comprising a screen installed within and substantially spanning the cavity of the body in visual communication with the two eyepieces so as to prevent visual communication between the eyepieces and the barrels, the display system further comprising a microprocessor and an electrically connected RF transceiver together comprising an electronics module and a camera installed in one of the spaced-apart barrels so as to be oriented having a line of sight thereof substantially in-line with one of the eyepieces and out of the barrel housing the camera, the camera being in electrical communication with the screen, the display system configured to receive at least display instructions from the remote wireless communication device for selective display of the image on the screen of the display system; whereby:
  a first user interacting with the remote wireless communication device selectively selects the image to be displayed by the display system of the apparatus through interaction with the remote wireless communication device and selectively sends the display instructions to the display system separately from any action by a second user interacting with the apparatus; and
  the selected image is displayed on the screen of the display system according to the display instructions for viewing by a second user looking through the two spaced-apart eyepieces simultaneously with a real-world scene captured by the camera and displayed on the screen under the control of the electronics module, the selected image thereby being superimposed over the real-world scene based on secret interaction of the first user with the display system of the apparatus via the wireless communication device for visually surprising the second user, the second user having no knowledge of the first user selecting the image and sending the display instructions to the display system and having no direct interaction with the display system relating to image selection.

19. The apparatus of claim 18 wherein the camera is electrically connected to a zoom control for selectively controlling display size on the screen of both the real-world scene and the selected image, the zoom control being electrically connected between the camera and the microprocessor, the zoom control being installed on the body substantially between the two eyepieces.

20. The apparatus of claim 18 wherein the display system is activated upon use of the apparatus by the second user so that the camera displays the real-world scene on the screen for viewing by the second user through the two eyepieces.

* * * * *